United States Patent
Enmeiji et al.

(10) Patent No.: US 6,557,658 B1
(45) Date of Patent: May 6, 2003

(54) FORKLIFT HAVING TRANSVERSE TRAVEL SYSTEM

(75) Inventors: Yoshiyuki Enmeiji, Osaka (JP);
Takeshi Nishikawa, Osaka (JP);
Yuusuke Kamo, Osaka (JP)

(73) Assignee: TCM Corporation, Osaka (JP)

( * ) Notice: Subject to any disclaimer, the term of this patent is extended or adjusted under 35 U.S.C. 154(b) by 0 days.

(21) Appl. No.: 09/743,559

(22) PCT Filed: May 8, 2000

(86) PCT No.: PCT/JP00/02948

§ 371 (c)(1),
(2), (4) Date: Jan. 9, 2001

(87) PCT Pub. No.: WO00/71459

PCT Pub. Date: Nov. 30, 2000

(30) Foreign Application Priority Data

| May 21, 1999 | (JP) | ............................ 11-140877 |
| Jun. 15, 1999 | (JP) | ............................ 11-167576 |
| Jul. 8, 1999 | (JP) | ............................ 11-193812 |
| Aug. 31, 1999 | (JP) | ............................ 11-244172 |

(51) Int. Cl.[7] .................................................. B62D 5/00
(52) U.S. Cl. ........................ 180/236; 180/234; 180/411; 180/415
(58) Field of Search .................... 180/408, 411, 180/414, 415, 305, 308, 234, 211, 236, 242

(56) References Cited

U.S. PATENT DOCUMENTS

| 3,255,840 A | * | 6/1966 | Tangen ........................ 180/236 |
| 3,596,730 A | * | 8/1971 | Ceece ......................... 180/236 |
| 3,696,881 A | * | 10/1972 | Gordon ....................... 180/411 |
| 4,024,968 A | * | 5/1977 | Shaffer et al. ............. 214/75 G |
| 4,284,159 A | * | 8/1981 | Voelz .......................... 180/140 |
| 4,432,690 A | * | 2/1984 | Monk .......................... 414/460 |
| 4,446,941 A | * | 5/1984 | Laurich-Trost ............. 180/236 |
| 4,498,554 A | * | 2/1985 | Young et al. ............... 180/236 |
| 4,750,628 A | * | 6/1988 | Laurich-Trost ............. 212/232 |
| 4,823,899 A | | 4/1989 | Ron ............................ 180/211 |
| 4,893,689 A | * | 1/1990 | Laurich-Trost ............. 180/140 |
| 5,213,143 A | * | 5/1993 | Policky et al. ............... 141/71 |
| 5,325,935 A | | 7/1994 | Hirooka et al. ............. 180/411 |
| 5,570,754 A | * | 11/1996 | Stimson ...................... 180/234 |
| 5,718,304 A | * | 2/1998 | Lee ............................. 180/415 |
| 5,899,292 A | * | 5/1999 | Paul et al. ................... 180/419 |
| 6,206,127 B1 | * | 3/2001 | Zakula, Sr. et al. ......... 180/236 |

FOREIGN PATENT DOCUMENTS

| JP | 264947 | 9/1912 |
| JP | 1-168580 | 7/1989 |
| JP | 2-306879 | 12/1990 |
| JP | 3-235762 | 10/1991 |

* cited by examiner

Primary Examiner—Lesley D. Morris
Assistant Examiner—Daniel Yeagley
(74) Attorney, Agent, or Firm—Fildes & Outland, P.C.

(57) ABSTRACT

During ordinary travel, a direction change cylinder (51) is actuated by an orbit roll (58) by turning a steering wheel (16) right and left, so that the rear wheels (4) can be turned for direction change in response to the operation of the steering wheel. When the direction change cylinder is actuated to the limit, the right and left rear wheels can be turned for direction change into an inclined state with their rear ends approaching each other, thereby making it possible to make a pivot turn. The front and rear wheel turning devices (30, 50) are actuated to turn the front wheels (3) and rear wheels around vertical axes (27, 49) for direction change by 90 degrees (directed exactly sideways). At this time, in the rear wheel turning device, with the direction change cylinder put in the neutral position, the rear wheel transverse travel cylinders (53) are actuated to turn the rear wheels for direction change by 90 degrees. After the front wheels and rear wheels have been turned for direction change so that they are directed exactly sideways, the front wheels are driven forward and backward by the travel driving device (21); thus, the forklift (1) can be transversely moved to the right or left.

4 Claims, 24 Drawing Sheets

FIG.5
(a)
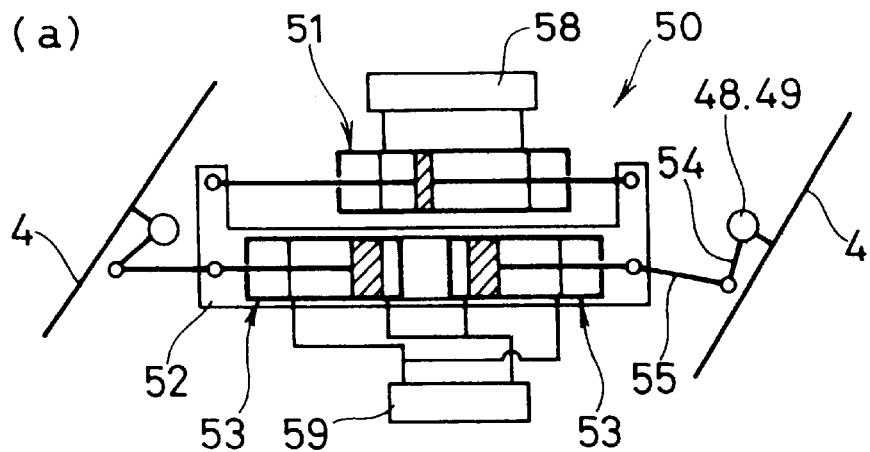
(b)
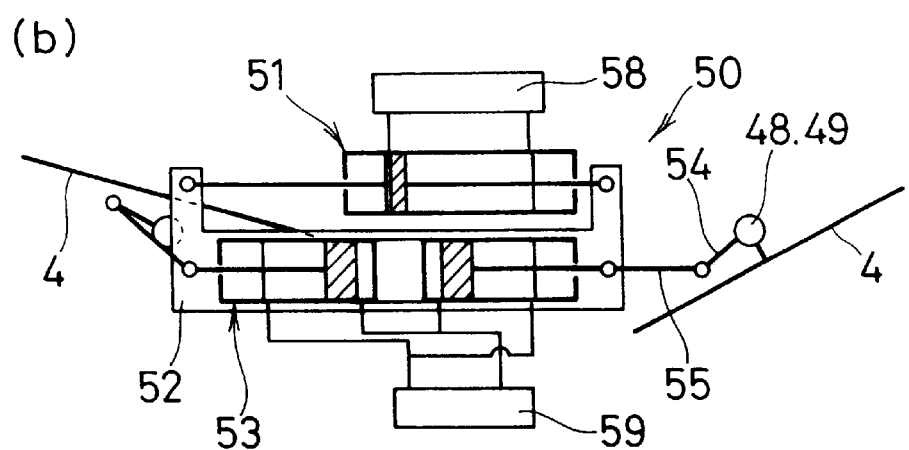
(c)
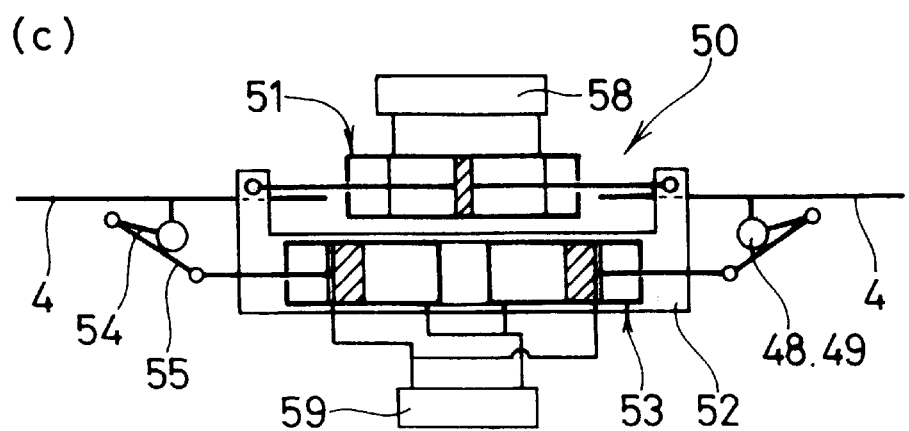

FIG.15
(a)
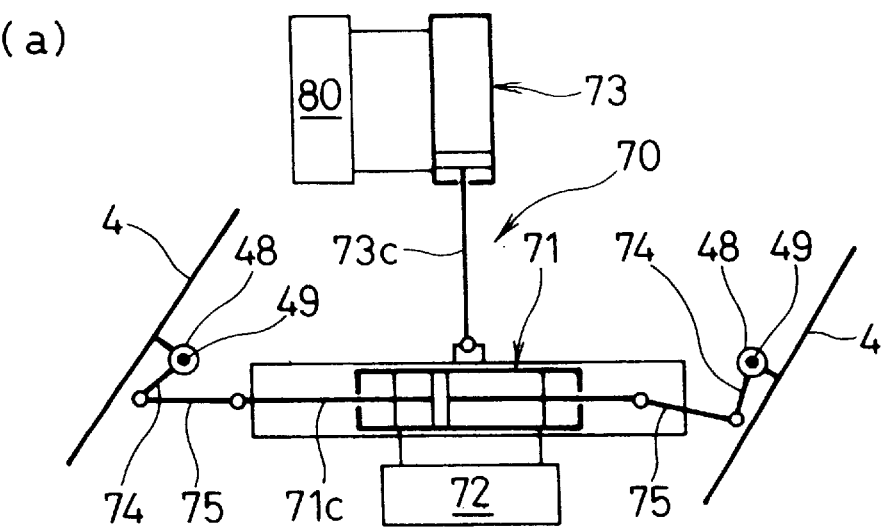
(b)
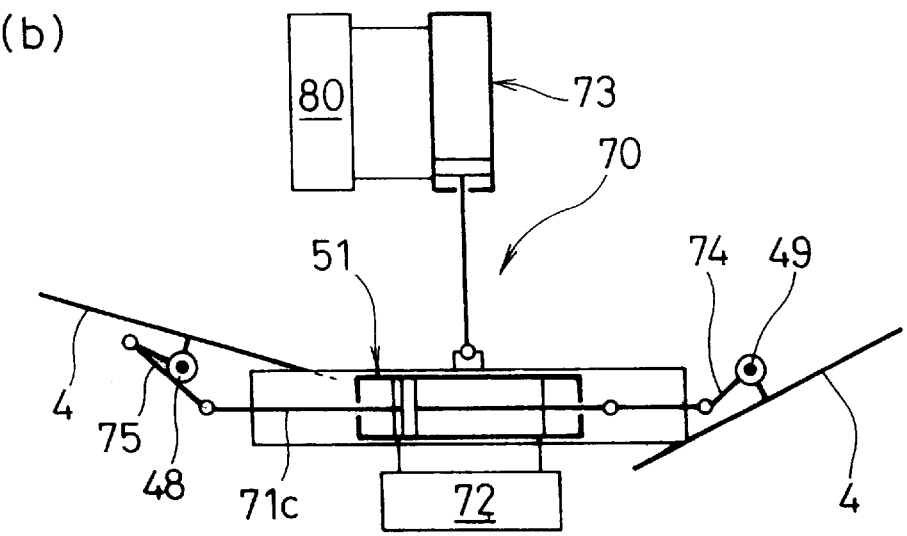
(c)
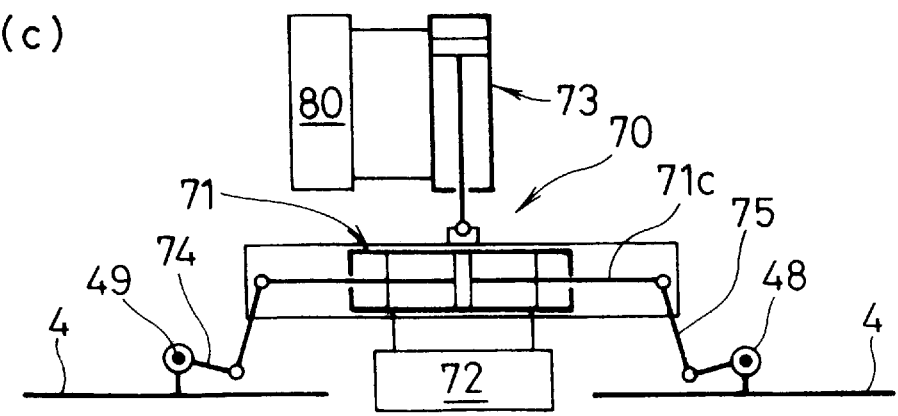

FIG.16
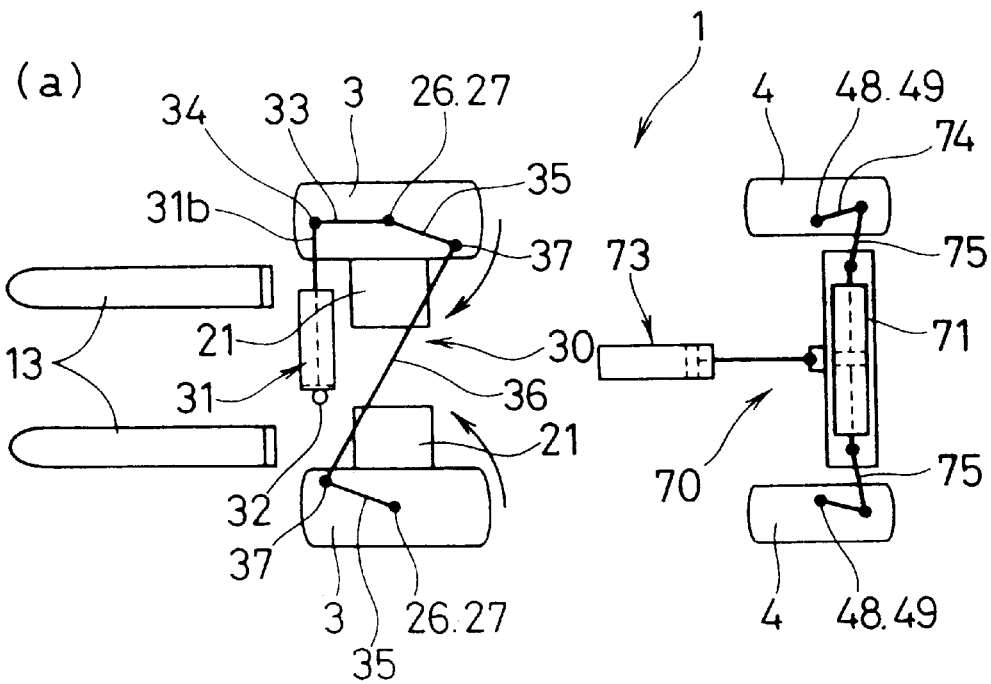
(a)
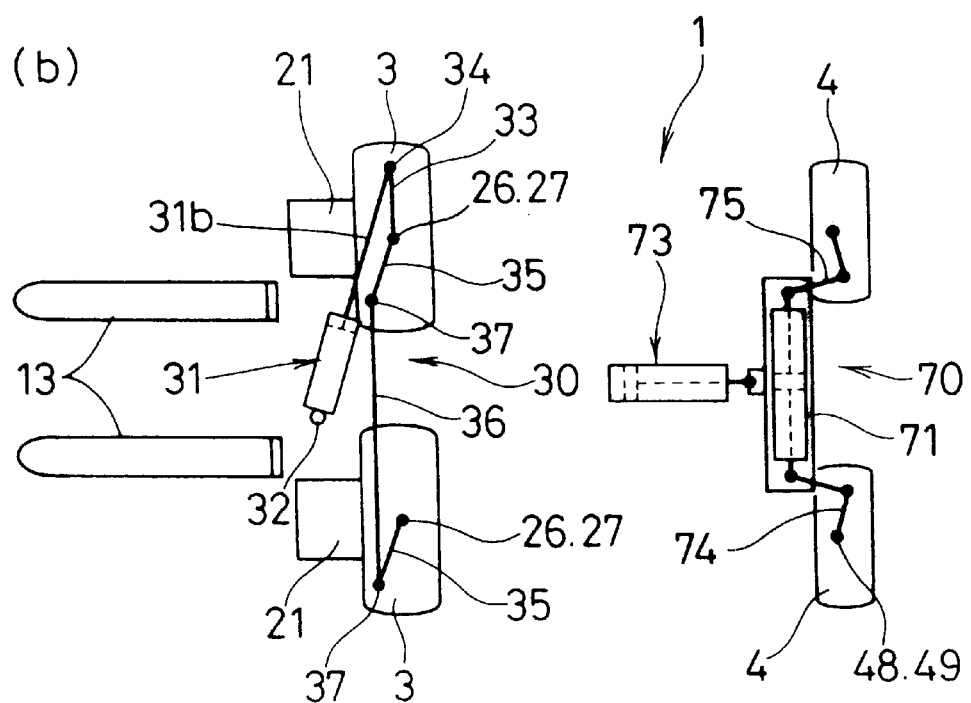
(b)

FIG.20
(a)
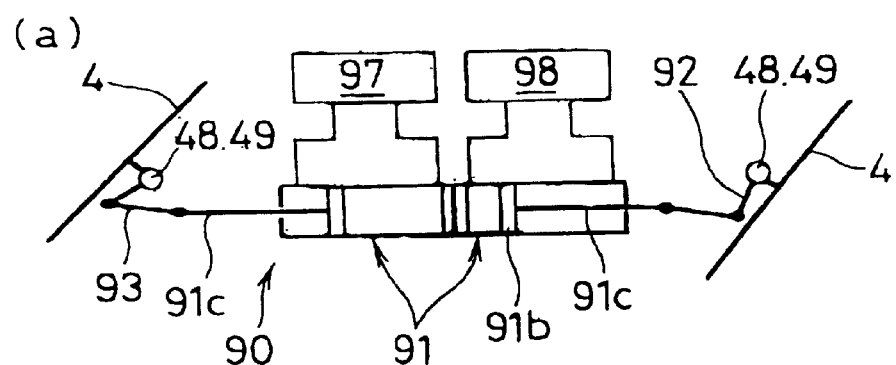
(b)
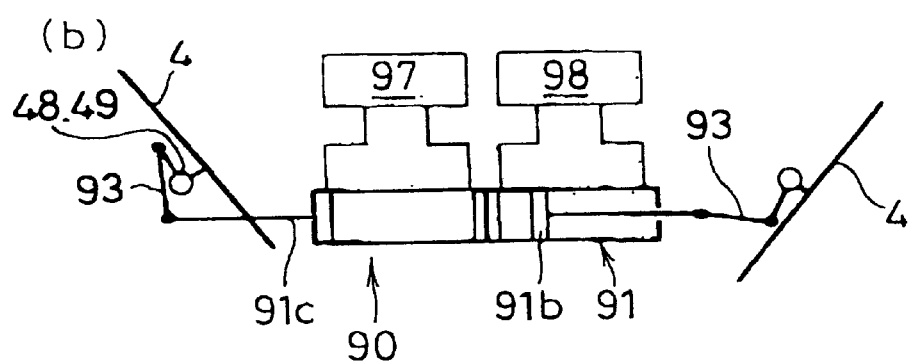
(c)
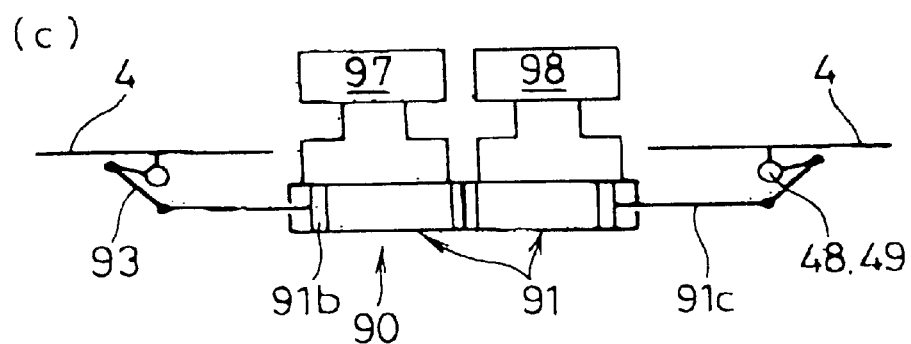

FIG.26
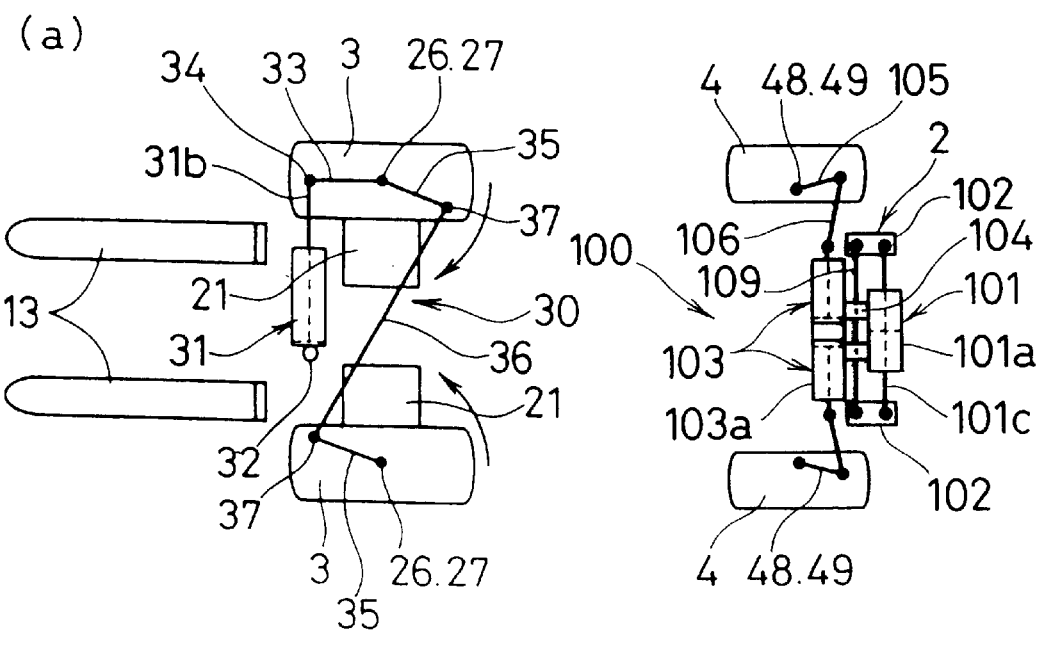
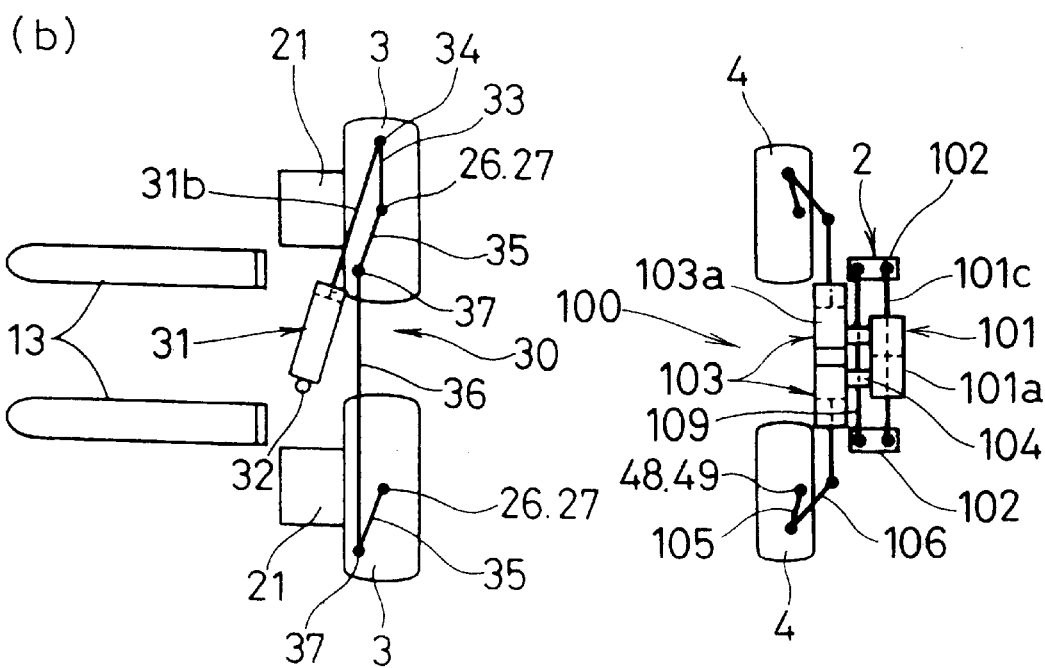

FIG. 27
(a)
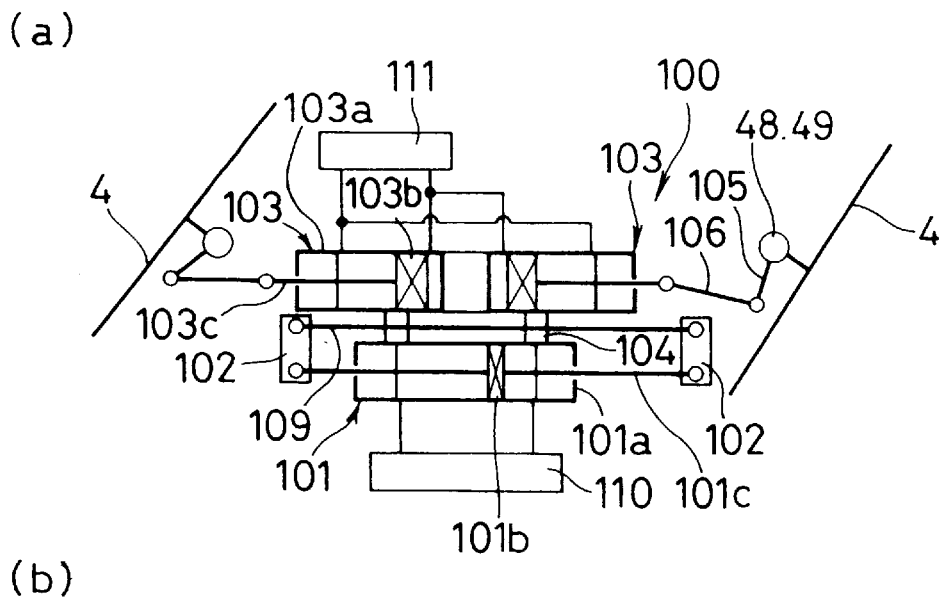
(b)
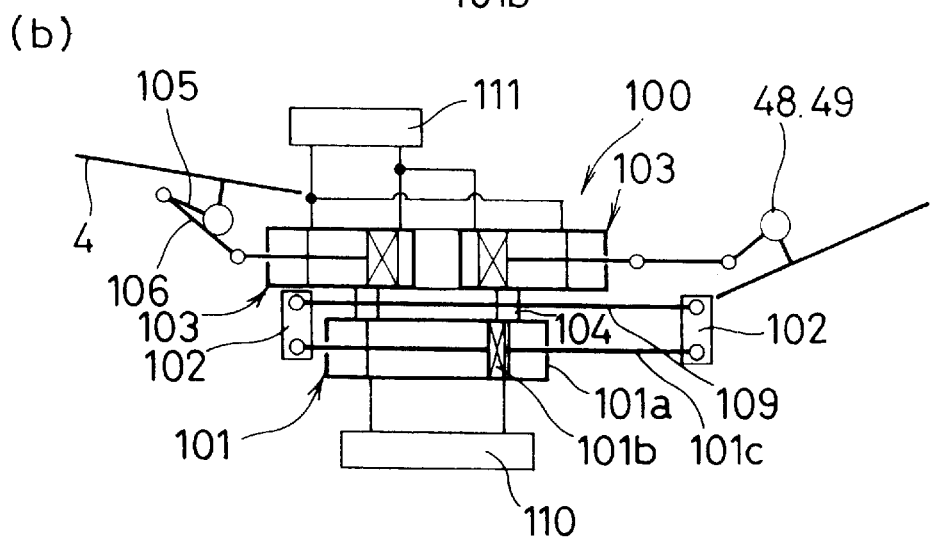
(c)
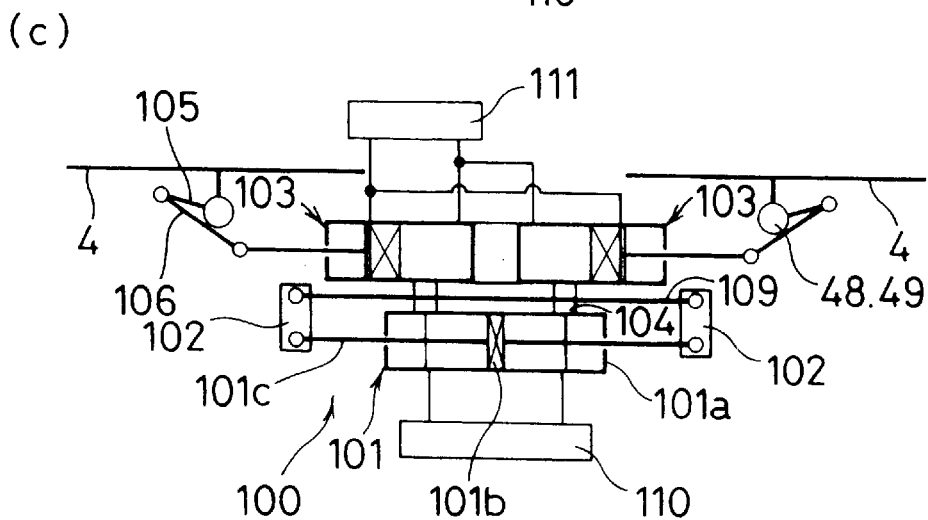

FORKLIFT HAVING TRANSVERSE TRAVEL SYSTEM

TECHNICAL FIELD

The present invention relates to a forklift having a transverse travel system that can be switched for transverse travel.

TECHNICAL FIELD

Vehicles having a transverse travel system have heretofore been found in large-sized transport vehicles and some types of loaders, and in forklifts they can be found in reach type electric vehicles. There are side forklifts for handling long-sized load, wherein the mast and forks are attached transversely of the direction of travel of the vehicle. In the engine type forklift of the counter type, however, there is no forklift that is capable of transverse travel in addition to doing ordinary work and that has the same functions as in the side forks. To establish such forklift, steering must be such that the front wheels (driving wheels) and the rear wheels (direction-change wheels) are directed exactly sideways. On this occasion, both front wheels are independently turned for direction change by actuators such as cylinders.

In the conventional forklift, however, in the case of changing the direction of the rear wheels to direct them exactly sideways, it has been difficult to attain compatibility between the direction change by the steering wheel during the ordinary travel and the direction change to transverse direction during the transverse travel. In addition, as methods for attaining compatibility between the direction change by the steering wheel during the ordinary travel and the direction change to transverse direction during the transverse travel, there is one in which a single rear wheel (steering axle) is used (3-wheel type). In this case, if the steering wheel is turned to the locked state during the transverse travel, transverse travel is allowed with the rear wheel directed sideways, but on the other hand, the 3-wheel type is inferior in stability to the 4-wheel type.

DISCLOSURE OF THE INVENTION

Accordingly, a first object of the present invention is to provide a forklift having a transverse travel system, which, despite the 4-wheel type, is capable of direction change during the ordinary travel and during the transverse travel.

Further, a second object of the invention is to provide a forklift having a transverse travel system, in which control for switching from ordinary travel to transverse travel can be smoothly effected by the operation of a common transverse travel control valve.

And a third object of the invention is to provide a forklift having a transverse travel system, which, despite the 4-wheel type, is capable of direction change during the ordinary travel and during the transverse travel and which simplifies the rear wheel turning means.

To achieve said first object, a forklift having a transverse travel system of the present invention with the vehicle body provided with a pair of right and left front wheels and a pair of right and left rear wheels, is characterized in that said front and rear wheels are respectively adapted to be turnable for direction change by 90 degrees, said pair of right and left front wheels are respectively operatively connected to drive shafts of travel driving devices, said travel driving devices being adapted to be turnable around vertical axes with respect to the vehicle body and being provided with front wheel turning means, while said pair of right and left rear wheels are adapted to be turnable around vertical axes with respect to the vehicle body and are provided with rear wheel turning means, said rear wheel turning means having a direction change cylinder and a pair of right and left rear wheel transverse travel cylinders that are adapted to separately turn the rear wheels when the direction change cylinder is in the neutral position and also adapted to assume a predetermined inoperative position during the actuation of the direction change cylinder.

According to the above arrangement of the invention, during the ordinary travel, the right and left front wheels and right and left rear wheels are longitudinally directed. At the time of ordinary travel, the steering wheel is turned clockwise or counterclockwise and the direction change cylinder is actuated by an orbit roll, when both rear wheel transverse travel cylinders are in a predetermined inoperative position and perform the function of a link, so that the rear wheels can be turned for direction change and turned according to the operation of the steering wheel. Further, when the direction change cylinder is actuated to move to the limit, the right and left rear wheels can be turned for direction change into an inclined state with their rear ends approaching each other, thereby making it possible to make a pivot turn.

In switching from ordinary travel to transverse travel, for example, a lever type transverse travel mode switch is operated to actuate the front wheel turning device and rear wheel turning device. That is, the front wheel turning device is actuated to turn the front wheels around vertical axes for direction change by 90 degrees (directed exactly sideways) with respect to the vehicle body. In this case, since the front wheels are integral with the travel driving device, such 90-degree direction change with respect to the vehicle body can be easily and smoothly effected.

Further, the rear wheel turning device is actuated to turn the rear wheels around vertical axes for direction change by 90 degrees (directed exactly sideways) with respect to the vehicle body. On this occasion, in the rear wheel turning device, with the direction change cylinder put in the neutral (linear movement) position, the rear wheel transverse travel cylinders are actuated, whereby the 90-degree turn of the rear wheels can be easily and smoothly effected.

After the front wheels and rear wheels have thus been turned for direction change so that they are directed exactly sideways, the front wheels are driven forward and backward by the travel driving device, whereby the forklift can be transversely moved to the right or left. On this occasion, the pair of right and left rear wheels are rotated in a follow-up manner. Thus, according to the invention, despite the 4-wheel type, direction change during the ordinary travel and during the transverse travel can be reliably made without requiring complicated electric control.

In order to achieve the second object, in a first embodiment of the invention relating to a forklift having a transverse travel system, the forklift is characterized in that said front wheel turning means has a front wheel transverse travel cylinder, said front wheel transverse travel cylinder and said rear wheel transverse travel cylinder being connected in parallel to a common transverse travel control valve respectively through open/close valves, wherein the rear wheel open/close valve is opened in response to a transverse travel operation, the rear wheel transverse travel cylinder is actuated to move to the transverse travel side in response to the operation of the transverse travel control valve, and the completion of the transverse orientation of the rear wheels is detected, whereby the rear wheel open/close valve is closed and the front wheel open/close valve is opened.

According to this first embodiment, when the transverse travel mode switch is operated, first the rear wheel open/close valve alone is opened, so that it is possible to turn the rear wheels for direction change by 90 degrees with respect to the vehicle body by actuating the rear wheel transverse travel cylinders by the operation of the transverse travel control valve. And the completion of the turning of the rear wheels for direction change is detected to close the rear wheel open/close valve and open the front wheel open/close valve, so that it is possible to turn the front wheels for direction change by 90 degrees with respect to the vehicle body by actuating the front wheel transverse travel cylinder by the operation of the transverse travel control valve.

This makes the transverse travel mode possible, so that the forklift can be transversely moved to the right or left by driving the front wheels forward and backward through the travel driving device. When this transverse travel is in progress, the front wheel open/close valve is kept open, so that by suitably operating the transverse travel control valve, it is possible to move the front wheel transverse travel cylinder only in a designated range; thus, positioning, turning and correction can be made during the transverse travel.

Thus, according to the first embodiment, control of switching from ordinary travel to transverse travel can always be smoothly effected despite the simple and inexpensive arrangement that operates the common transverse travel control valve. And the subsequent operation of the transverse travel control valve enables smooth control of transverse travel.

In a second embodiment of the invention relating to a forklift having a transverse travel system, the forklift is characterized in that the rear wheel transverse travel cylinders of the rear wheel turning means are adapted to move the direction change cylinder, which is now in the neutral position, back and forth so as to turn the rear wheels for direction change by 90 degrees, and also adapted to assume a predetermined inoperative position during the actuation of the direction change cylinder.

According to this second embodiment, in switching from ordinary travel to transverse travel, with the direction change cylinder put in the neutral position, for example, a lever type transverse travel mode switch is operated to actuate the front wheel turning means and rear wheel turning means. That is, the front wheel turning means is actuated to turn the front wheels around vertical axes for direction change by 90 degrees (directed exactly sideways) with respect to the vehicle body. Further, the rear wheel turning means is actuated to turn the rear wheels around vertical axes for direction change by 90 degrees (directed exactly sideways) with respect to the vehicle body. On this occasion, in the rear wheel turning means, with the direction change cylinder put in the neutral (linear movement) position, the rear wheel transverse travel cylinders are actuated, whereby turning of the rear wheels for direction change can be easily and smoothly effected.

After the front wheels and rear wheels have thus been turned for direction change so that they are directed exactly sideways, the front wheels are driven forward and backward, so that the forklift can be transversely moved to the right or left. Thus, according to this second embodiment, despite the 4-wheel type, the turning for direction change during the ordinary travel and the turning of the direction change wheels to direct the latter exactly sideways during the transverse travel can be reliably effected without requiring complicated electric control.

In a third embodiment of the invention relating to a forklift having a transverse travel system, the forklift is characterized in that the rear wheel turning means respectively have direction change cylinders corresponding to both rear wheels, at least one of said direction change cylinders being electrically controlled.

According to this third embodiment, despite the 4-wheel type, turning for direction change during normal travel can be reliably effected and so can be transverse travel. And in the rear wheel turning means, at least one of the two direction change cylinders is electrically controlled, so that turning of both rear wheels for direction change can always be smoothly effected without a time lag.

In order to achieve the third object, in a fourth embodiment of the invention relating to a forklift having a transverse travel system, the forklift is characterized in that the rear wheel turning means has a direction change cylinder and a pair of right and left rear wheel transverse travel cylinders, said cylinders having integrated main bodies, said direction change cylinder having its piston rod fixed to the vehicle body and its main body adapted to be movable, said rear wheel transverse travel cylinders being adapted to separately turn the rear wheels when the direction change cylinder is in the neutral position and also adapted to assume a predetermined inoperative position during the actuation of the direction change cylinder.

According to this fourth embodiment, the rear wheel turning means is actuated to turn the rear wheels around vertical axes for direction change by 90 degrees (directed exactly sideways) with respect to the vehicle body. On this occasion, in the rear wheel turning means, with the direction change cylinder put in the neutral (linear movement) position, the rear wheel transverse travel cylinders are actuated, so that the turning of the rear wheels for direction change by 90 degrees can be easily and smoothly effected. Therefore, according to the fourth embodiment, despite the 4-wheel type, turning for direction change during the ordinary travel and during transverse travel can be reliably effected without requiring complicated electric control. Furthermore, the rear wheel turning means is constructed such that the main bodies of the direction change cylinder and rear wheel transverse travel cylinders are integrated and the direction change cylinder has its piston rod fixed to the vehicle body and its main body adapted to be movable; therefore, the whole structure can be simplified, and the movement of the direction change cylinder can be accurately reflected on the rear wheel transverse travel cylinders to improve relative positional accuracy.

BRIEF DESCRIPTION OF THE DRAWINGS

FIG. 5 is an operation-explanatory view of the rear wheel portion of the forklift having a transverse travel system, the forklift being (a) during the turn, (b) during the pivot turn and (c) during the transverse travel;

FIG. 15 is an operation-explanatory view of the rear wheel portion of said forklift having a transverse travel system, the forklift being (a) during the turn, (b) during the pivot turn, and (c) during the transverse travel;

FIG. 16 is a schematic plan view of said forklift having a transverse travel system, the forklift being (a) during the ordinary travel, and (b) during the transverse travel;

FIG. 20 is an operation-explanatory view of the rear wheel portion of said forklift having a transverse travel system, the forklift being (a) during the turn, (b) during the pivot turn, and (c) during the transverse travel;

FIG. 26 is a schematic plan view of said forklift having a transverse travel system, the forklift being (a) during the ordinary travel, and (b) during the transverse travel; and FIG. 27 is an operation-explanatory view of the rear wheel portion of said forklift having a transverse travel system, the forklift being (a) during the turn, (b) during the pivot turn, and (c) during the transverse travel.

BEST MODE FOR EMBODYING THE INVENTION

Figure 1:
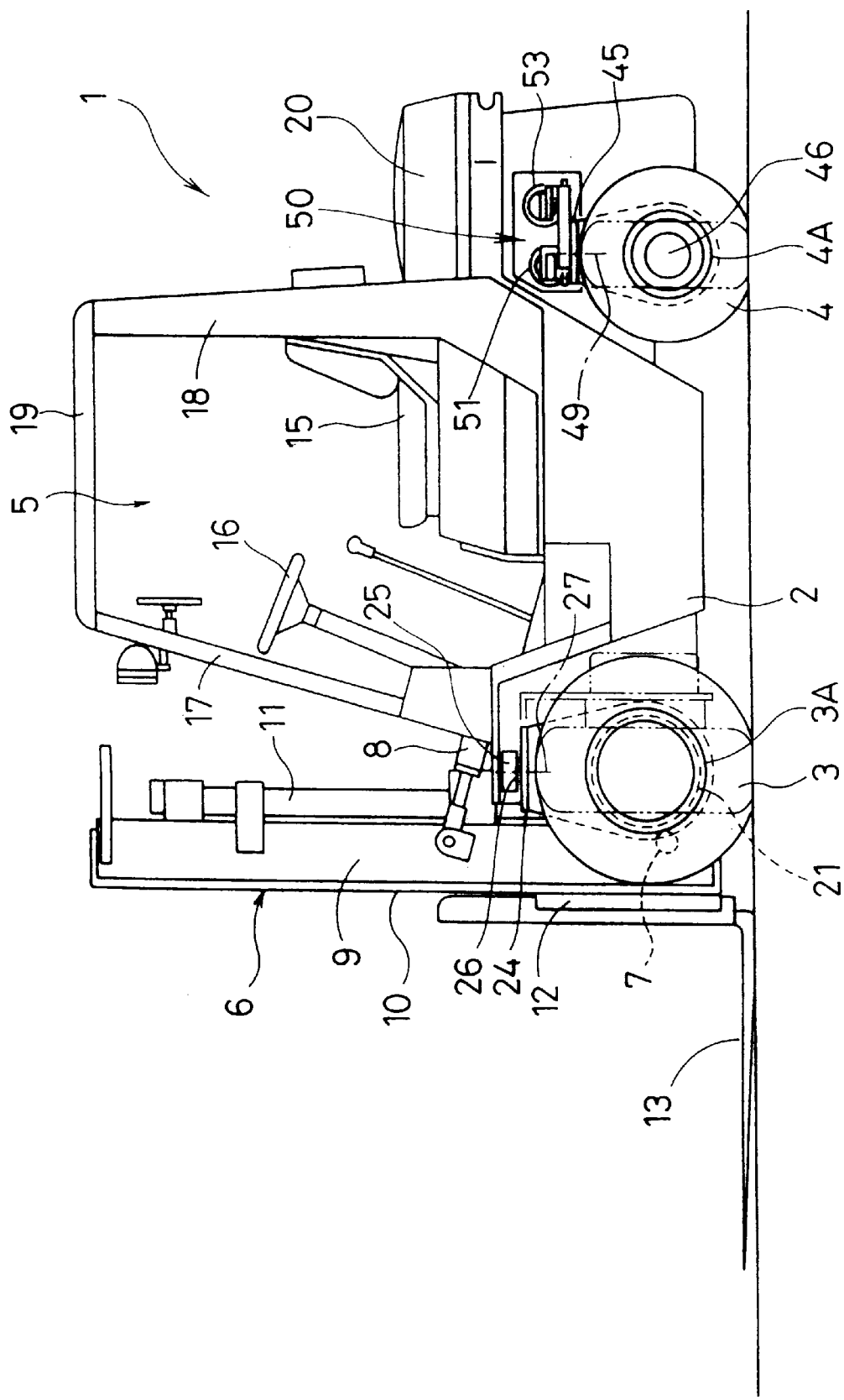
FIG. 1, showing a first embodiment of the invention, is a side view of a forklift having a transverse travel system, during the ordinary travel.

A first embodiment of the invention, employed in an ordinary forklift, will now described with reference to FIGS. 1 through 7.

In FIGS. 1 through 4, a forklift 1 having a transverse travel system is provided with a pair of right and left front wheels (driving wheels) 3 in the front of the vehicle body 2, a pair of right and left rear wheels (direction change wheels) 4 in the rear, and a driver's box 5 is installed in the front of the vehicle body 2 and in the upper region of the latter. A vertically extensible mast 6 is attached to the front end of said vehicle body 2 in such a manner that said mast 6 is turnable back and forth through a widthwise-connecting shaft 7, and a tilt cylinder 8 for back and forth turning movement is installed between the vehicle body 2 and. the mast 6.

Said mast 6 comprises a pair of right and left outer frames 9 associated with the forklift 1 and a pair of right and left inner frames 10 capable of up and down movement as they are guided by said outer frames 9. And a lift cylinder 11 is installed between the outer and inner frames 9 and 10. Further, a lift bracket 12 is installed which is capable of up and down movement as it is guided by the inner frames 10, said lift bracket 12 having a pair of right and left forks 13 installed thereon through a pair of upper and lower finger bars.

Disposed in the driver's box 5 are a seat 15, a steering wheel 16 positioned forwardly of the seat 15. And a head guard 19 is disposed above the driver's box 5 through front pipes 17 and rear pipes 18 erected from the vehicle body 2. Further, a counterweight 20 is disposed rearwardly of the seat 15 and on the main body 2.

The pair of right and left front wheels 3 and pair of right and left rear wheels 4 are installed such that they are respectively capable of changing their direction so that they are at right angles with the vehicle body 2 (turnable for direction change so that they are directed exactly sideways). That is, the pair of right and left front wheels 3 have rims 3A that are attached directly to the rotary flanges (a kind of driving shafts) 22 of hydraulic motors (a kind of travel driving devices) 21 through connectors 23, whereby the front wheels 3 are operatively connected to the hydraulic motors 21.

And the mounts of the hydraulic motors 21 are each transversely attached to the vertical plate portion of an inverted L-shaped turning member 24, while the transverse plate portion on the turning member 24 is installed through a bearing 25 and a vertical shaft 26 so that it is turnable around a vertical axis 27 with respect to the vehicle body 2. On this occasion, it is arranged that the vertical axis 27 is positioned immediately above the front wheel 3.

A front wheel turning means 30 is provided for turning said hydraulic motor 21, i.e., the turning member 24. The front wheel turning means 30 has a front wheel transverse travel cylinder 31, whose main body 31a is swingably attached to the vehicle body 2 through a vertical pin 32. Further, a piston rod 31b is relatively turnably connected through a vertical connecting pin 34 to a link 33 fixed to the turning member 24 on one side. And arms 35 extending from the right and left vertical shafts 26 are relatively turnably connected through a link body 36 and connecting pins 37.

Therefore, the actuation of the front wheel transverse cylinder 31 turns the turning member 24 through the link 33, whereby it is possible to turn the front wheel 3 on one side for direction change around the vertical axis 27 so that it is directed exactly sideways and to turn the front wheel 3 on the other side for direction change around the vertical axis 27 through the arm 35 and the link body 36 so that it is directed exactly sideways. That is, according to the front wheel turning device 30, it is arranged that the actuation of the common front wheel transverse cylinder 31 causes the right and left front wheels 3 to change their directions mutually oppositely so that they are directed exactly sideways. Said 31–37 constitute by way of example the front wheel turning device 30.

Figure 7:
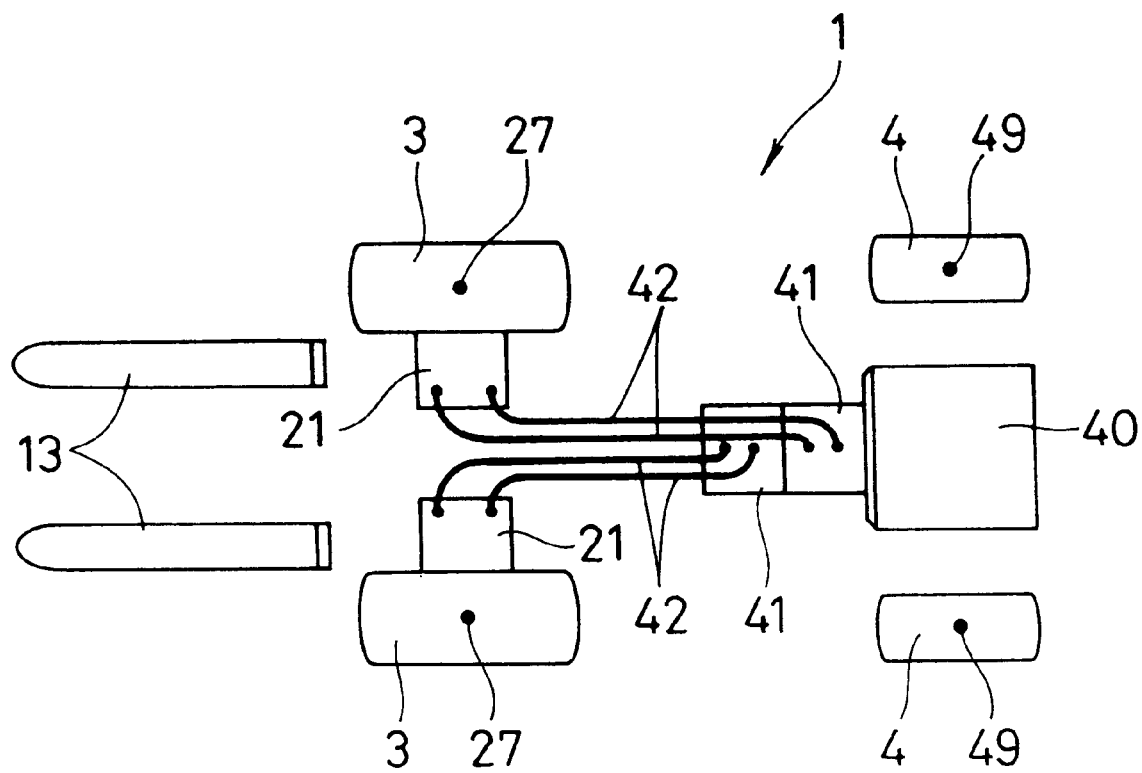
FIG. 7 is a schematic plan view of said forklift having a transverse travel system.
Figure 8:
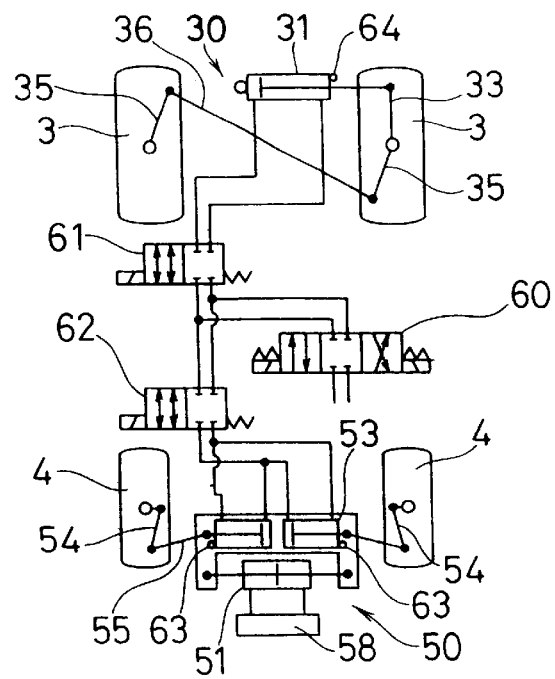
FIG. 8, showing a second embodiment of the invention, is a schematic plan view of a forklift having a transverse travel system, during the ordinary travel.

In FIG. 7, said vehicle body 2 is provided with an engine 40 and a pair of hydraulic pumps 41 driven by said engine 40. And the hydraulic pumps 41 and hydraulic motors 21 that correspond to each other are interconnected for communication through piping (such as hydraulic hoses) 42 in such a manner that one hydraulic pump 41 corresponds to one hydraulic motor 21, that is, a 2-pump 2-motor type hydraulically driven system (HST system) is established.

In FIGS. 1 through 4, the pair of right and left rear wheels 4 are freely rotatably attached at their rims 4A to the vertical plate portions of the turning members 45 through the transverse axles 46 or the like. Further, the transverse plate portion of the turning member 45 is installed through a bearing 47 and a vertical shaft 48 so that it is turnable around a vertical axis 49 with respect to the vehicle body 2.

Rear wheel turning devices 50 are provided for turning the pair of right and left rear wheels 4 around vertical axes 49, said rear wheel turning device 50 comprising a direction change cylinder 51, a rear wheel transverse travel cylinder 53, etc.

That is, the direction change cylinder 51 has its main body 51a attached to the vehicle body 2, and a piston rod 51c connected to its piston 51b projects widthwise of the vehicle to the opposite sides. And a holding frame 52 is installed between the projecting opposite ends of the piston rod 51c.

A pair of right and left rear wheel transverse travel cylinders 53 are attached at their main bodies 53a to said holding frame 52, and piston rods 53c connected to the pistons 53b of these rear wheel transverse travel cylinders 53 respectively project outward widthwise of the vehicle. And the arm body 54 connected to said vertical shaft 48 and the projecting end of the piston rod 53c are relatively turnably connected together through a link 55 and vertical connecting pins 56 and 57.

Said direction change cylinder 51 is so designed that turning the steering wheel 16 causes an orbit roll (all hydraulic type power steering system) 58 to perform operations for movement to the right or left. Further, the pair of right and left rear wheel transverse travel cylinders 53 are adapted to actuate a control valve 59 when the direction change cylinder 51 is in the neutral position, thereby making the rear wheels 4 separately turnable, said cylinders 53 being adapted to assume a predetermined inoperative position during the actuation of the direction change cylinder 51.

Therefore, the actuation of the rear wheel transverse travel cylinder 53 turns the vertical shaft 48 through the link 55 and arm body 54, thereby turning the rear wheel 4 for direction change around the vertical axis 49 through the turning member 45 so that it is directed exactly sideways. That is, it is arranged that the actuation of the rear wheel transverse travel cylinder 53 causes the right and left rear wheels 4 to change their directions mutually oppositely so that they are directed exactly sideways. Said 51–59 consitute by way of example the rear wheel turning device 50 for turning the pair of right and left rear wheels 4 around the vertical axes 49.

The operation of the first embodiment described above will now be described.

The solid lines in FIGS. 1, 2 and 3, and FIG. 4 show liner movement during the ordinary travel. The right and left front wheels 3 and right and left rear wheels 4 at this time are directed in the longitudinal direction. Such forklift 1 can be moved by the operator sitting on the seat 15 of the driver's box 5 and operating the steering wheel 16.

And by operating the lift lever to actuate the lift cylinder 11, it is possible to move the forks 13 up and down through the lift bracket 12, etc., along the mast 6, whereby an intended fork-work can be done. Further, by operating the tilt lever to actuate the tilt cylinder 8, it is possible to turn (tilt) the mast 6 around the connecting shaft 7, whereby the position of the forks 13 can be changed through the lift bracket 12, etc.

During said travel, the direction change can be made according to the operation of the steering wheel 16. That is, if the steering wheel 16 is turned counterclockwise, for example, as shown in (a) of FIG. 5, the direction change cylinder 51 is actuated to the left by the orbit roll 58, the holding frame 52 being integrally moved to the left. At this time, both rear wheel transverse travel cylinders 53 are in the inoperative position at the predetermined contraction limit, thus performing the function of a link.

Therefore, the leftward movement of the holding frame 52 is transmitted to the arm bodies 54 through the rear wheel transverse travel cylinders 53 and the links 55, thereby turning the turning members 45 around the vertical axes 49, thus making it possible to turn the rear wheels 4 to the left. In addition, since one of the rear wheel transverse travel cylinders 53 is subjected to tension during the ordinary turn in response to the operation of the steering wheel 16, preventive measures are taken against leakage by placing a check valve in the circuit or by periodically applying pressure to the rear wheel transverse travel cylinders 53.

Further, as shown in (b) of FIG. 5, when the direction change cylinder 51 is actuated to move to the leftward limit, the right and left rear wheels 4 can be turned for direction change into an inclined state with their rear ends approaching each other, thereby making it possible to make a pivot turn.

Figure 4:
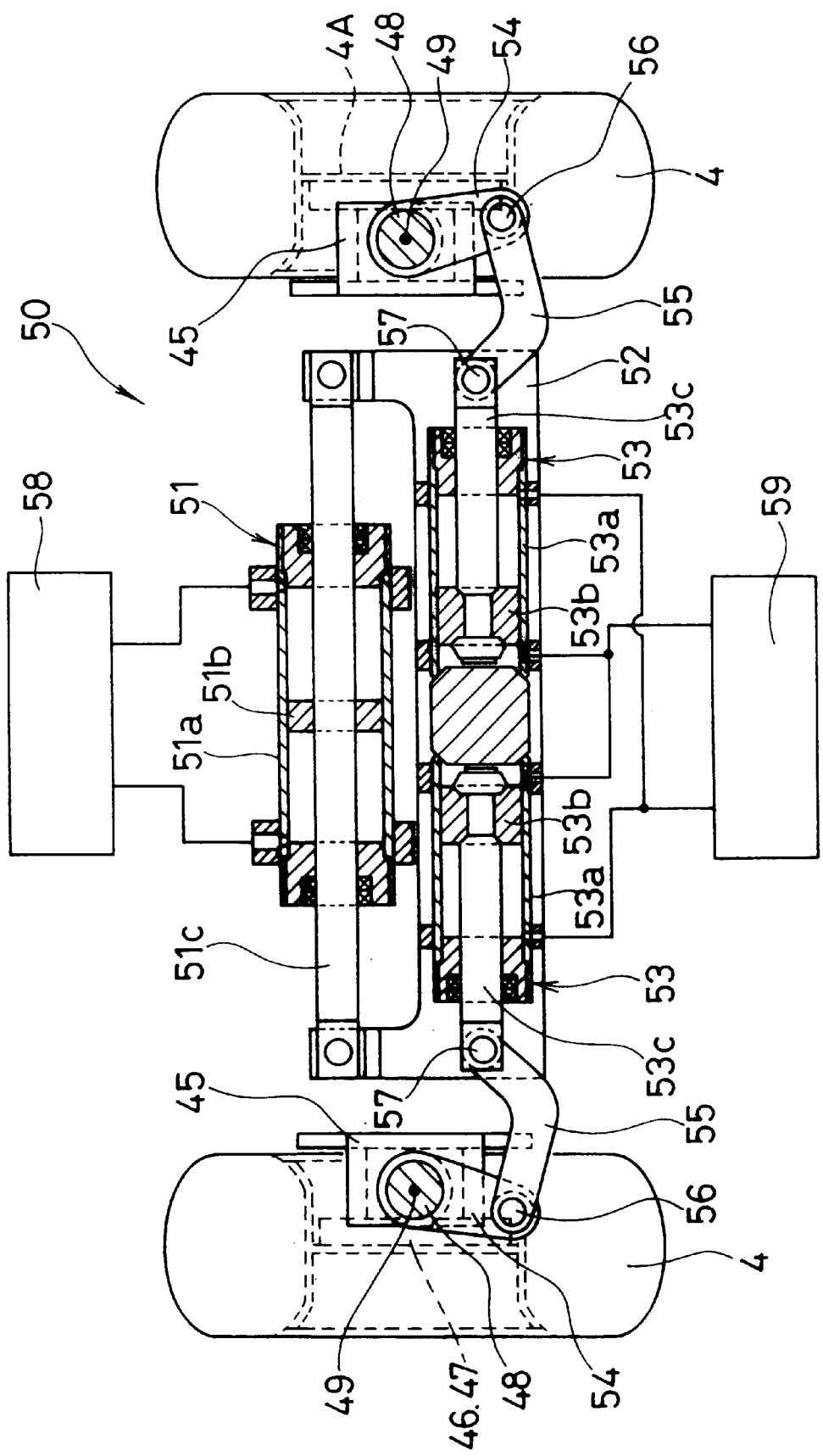
FIG. 4 is a fragmentary plan view of part of the rear wheel portion of the forklift having a transverse travel system.

When the aforesaid switching from longitudinal travel to transverse travel is to be effected, first the directions change cylinder 51 is put in the neutral (linear travel) position shown in FIG. 4. In this state, for example, a lever type transverse travel mode switch (not shown) is operated to actuate the front wheel turning means 30 and rear wheel turning mean 50.

Figure 2:
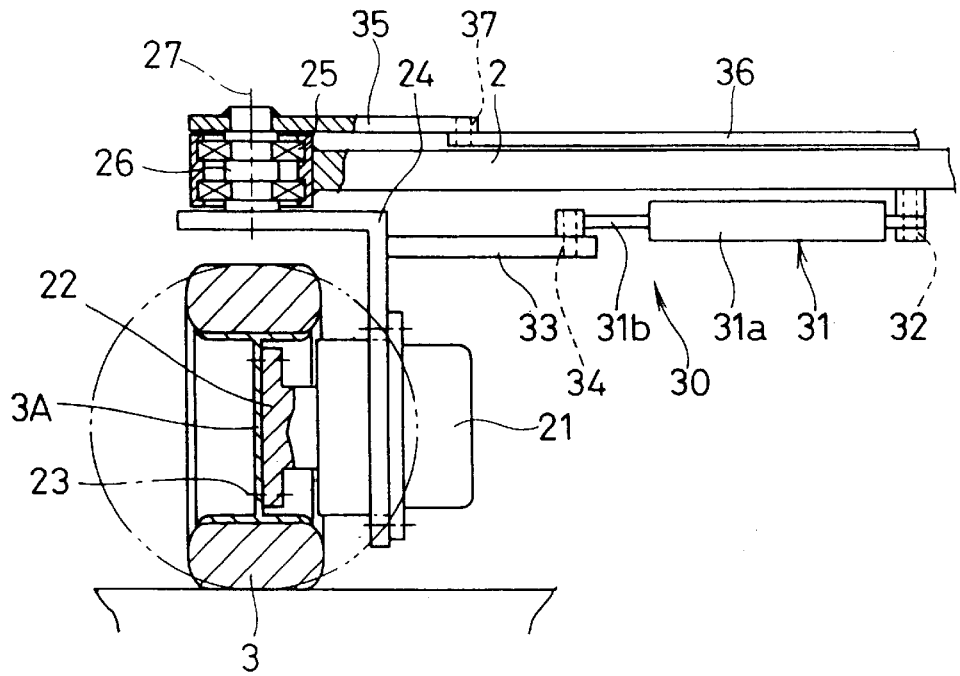
FIG. 2 is a fragmentary front view of part of the front wheel portion of the forklift having a transverse travel system.
Figure 6:
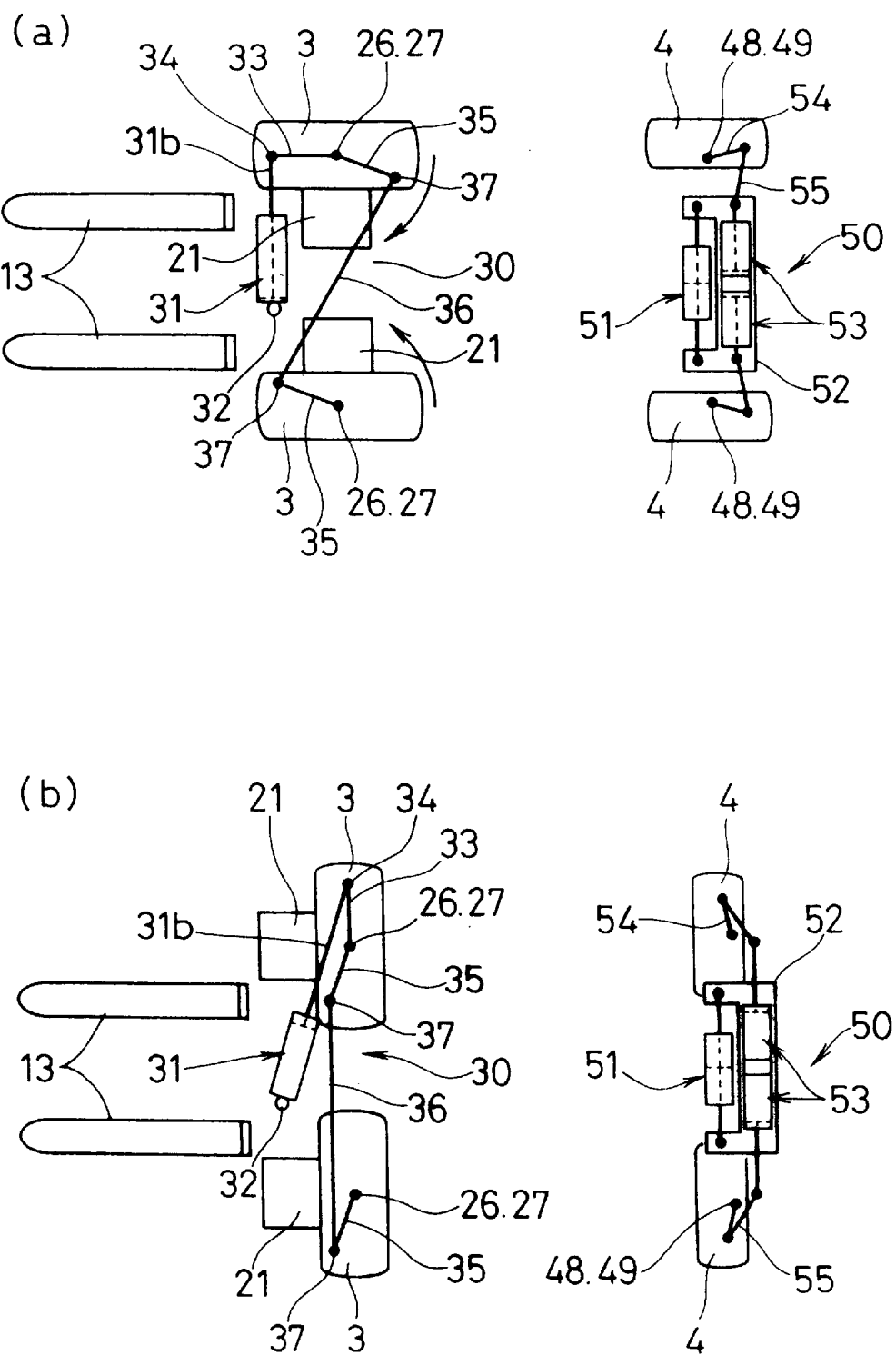
FIG. 6 is a schematic plan view of said forklift having a transverse travel system, the forklift being (a) during the ordinary travel, and (b) during the transverse travel.

That is, in the front wheel turning means 30, the tilting of the lever actuates the front wheel transverse travel cylinder 31 to turn the turning members 24 around the vertical axes 27 through the link 33, etc., whereby, as shown in phantom lines in FIGS. 1 and 2 and in (b) of FIG. 6, the front wheels 3 are turned for direction change by 90 degrees (directed exactly sideways) with respect to the vehicle body 2. Since the front wheels 3 are respectively integral with the hydraulic motors 21, the 90-degree direction change can be made easily and smoothly. And since the vertical axis 27 is positioned immediately above the front wheel 3, the front wheel 3 is compact and can change its direction by 90 degrees.

Further, in the rear wheel turning means 50, both rear wheel transverse travel cylinders 53 are extended by the control valve 59, and the projecting movement of the piston rods 53c is transmitted to the arm bodies 54 through the links 55, thereby turning the turning members 45 around the vertical axes 49. Thereby, as shown in phantom lines in FIGS. 1 and 3 and in (c) of FIG. 5 and (b) of FIG. 6, the rear wheels 4 are turned for direction change by 90 degrees (directed exactly sideways) with respect to the vehicle body 2.

The fact that the front wheels 3 or rear wheels 4 are thus turned for direction change, or that the front wheels 3 or rear wheels 4 are thus turned for direction change so as to be directed exactly sideways, is sensed by a sensor to light an indicator lamp; thus, the transverse travel mode becomes possible. Therefore, the oil pressure from the pair of hydraulic pump 41 driven by the engine 40 is fed to the corresponding hydraulic motors 21 through the piping 42 through forward-backward rotation control in the driver's box 5, thereby driving the front wheels 3 forward or backward; thus, the forklift 1 can be transversely moved to the right or left. On this occasion, the pair of right and left rear wheels 4 are rotated in a follow-up manner.

The fact that transverse travel can be effected in this manner makes it possible to carry,for example, long-sized work through the forks 13 with ease.

A second embodiment of the invention will now be described with reference to FIGS. 8 through 11.

The front wheel transverse travel cylinder 31 and rear wheel transverse travel cylinders 53 are arranged in parallel with a common transverse travel control valve 60 and are connected thereto through solenoid type open/close valves 61 and 62, respectively. The open/close valves 61 and 62 are so arranged that first the rear wheel open/close valve 62 opens in response to the operation for transverse travel and the operation of the transverse travel control valve 60 actuates the rear wheel transverse travel cylinders 53 to move to the transverse travel side.

And the rear wheel transverse travel cylinders 53 are provided with rear wheel sensors 63 for detecting the completion of sideways turn of the rear wheels 4. It is arranged that the detection by the rear wheel sensors 63 closes the rear wheel open/close valve 62 and opens the front wheel open/close valve 61. Thereby, the operation of the transverse travel control valve 60 actuates the front wheel transverse travel cylinder 31 to move to the transverse travel side. And the front wheel transverse travel cylinder 31 is provided with a front wheel sensor 64 for detecting the completion of the sideways turn of the front wheels 3.

Figure 9:
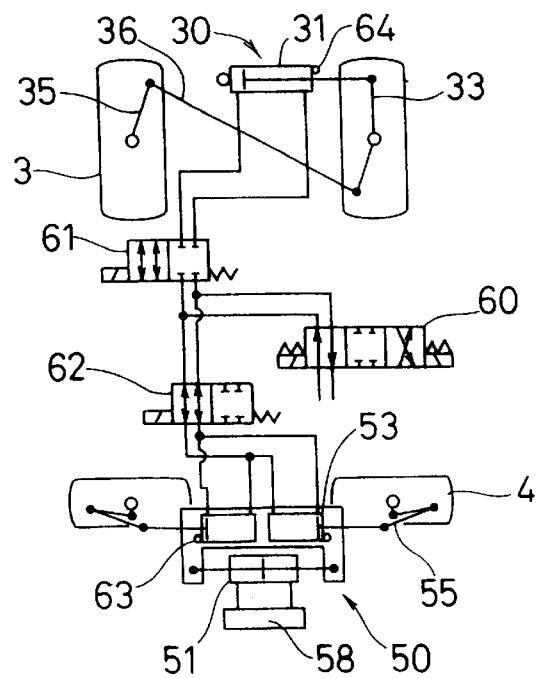
FIG. 9 is a schematic plan view of said forklift having a transverse travel system, during the rear wheel direction change.

In this second embodiment, when the transverse travel mode switch is operated in order to switch from ordinary travel to transverse travel, as shown in FIG. 9, first the rear wheel open/close valve 62 alone is opened and the operation of the transverse travel control valve 60 causes the rear wheel transverse travel cylinders 53 to have their extending chambers fed with pressure so that they are extended. Thereupon, the projecting movement of the piston rods 53c is transmitted to the arm bodies 54 through the links 55, turning the turning members 45 around the vertical axes 49; thus, the rear wheels 4 are turned for direction change by 90 degrees (directed exactly sideways) with respect to the vehicle body 2.

Figure 10:
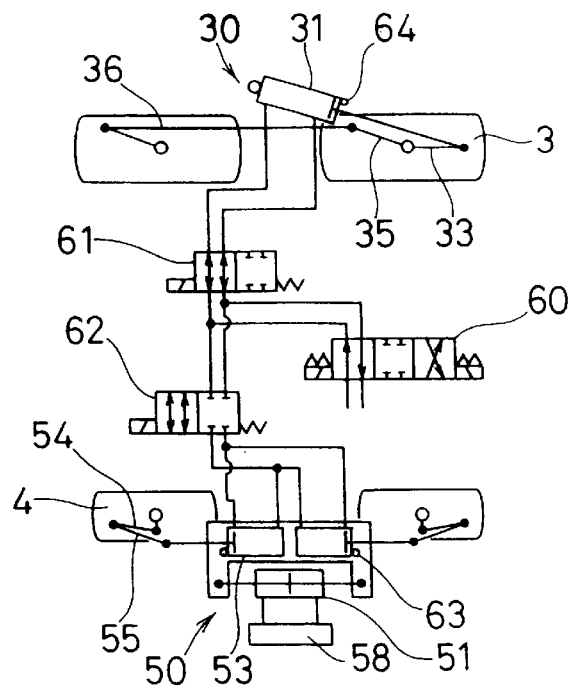
FIG. 10 is a schematic plan view of said forklift having a transverse travel system, during the front wheel direction change.

And when the direction change of the rear wheels 4 is completed, this completion is detected by the rear wheel sensors 63 and this detection signal, as shown in FIG. 10, closes the rear wheel open/close valve 62 and opens the front wheel open/close valve 61.

Therefore, the operation of the transverse travel control valve 60 causes the front wheel transverse travel cylinder 31 to have its extending chamber fed with pressure so that it is extended. Thereupon, the projecting movement of the piston rods 31b is transmitted to the vertical shaft 34 through the link 33, turning the turning members 24 around the vertical axes 27; thus, the front wheels 3 are turned for direction change by 90 degrees (directed exactly sideways) with respect to the vehicle body 2.

And when the direction change of the front wheels 3 is completed, this completion is detected by the front wheel sensor 64 and this detection signal lights the indicator lamp, thereby allowing the transverse travel mode. Therefore, the forklift 1 can be transversely moved to the right and left by driving the front wheels 3 forwardly and backwardly through the hydraulic motors 21.

Figure 11:
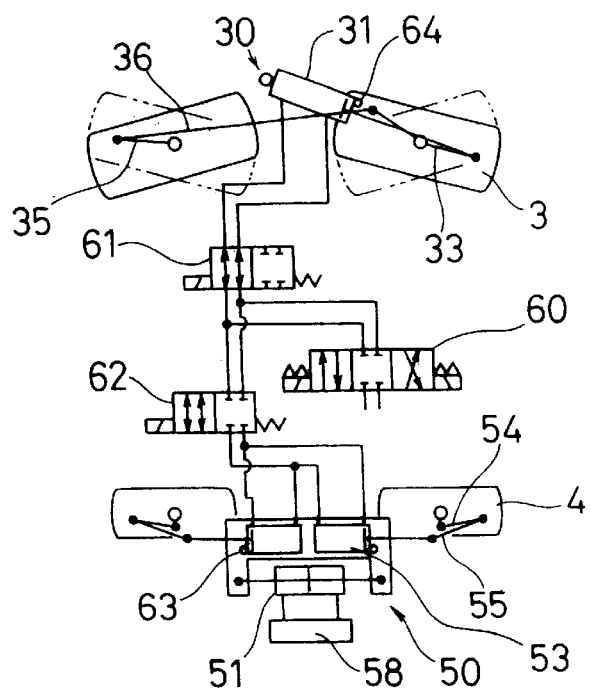
FIG. 11 is a schematic plan view of said forklift having a transverse travel system, during the transverse travel.

When such transverse travel is in progress, the front wheel open/close valve 61 is kept open, so that by suitably operating the transverse travel control valve 60, it is possible to move the front wheel transverse travel cylinder 31 only in a designated range (about ±5° in terms of the angle of the front wheels 3, as shown in solid lines or phantom lines in FIG. 11); thus, positioning, turning and correction can be made during the transverse travel. On this occasion, the front wheel sensor 64 is designed to emit a corrective operation range signal.

In the second embodiment described above, the control for switching from ordinary travel to transverse travel can always be smoothly effected by actuating the front wheel transverse travel cylinder 31 after actuating the rear wheel transverse travel cylinders 53 by the operation of the common transverse travel control valve 60, and the control for transverse travel can also be smoothly effected by actuating the front wheel transverse travel cylinder 31 by the subsequent operation of the transverse travel control valve 60.

A third embodiment of the invention will now be described with reference to FIGS. 12 through 16.

Figure 12:
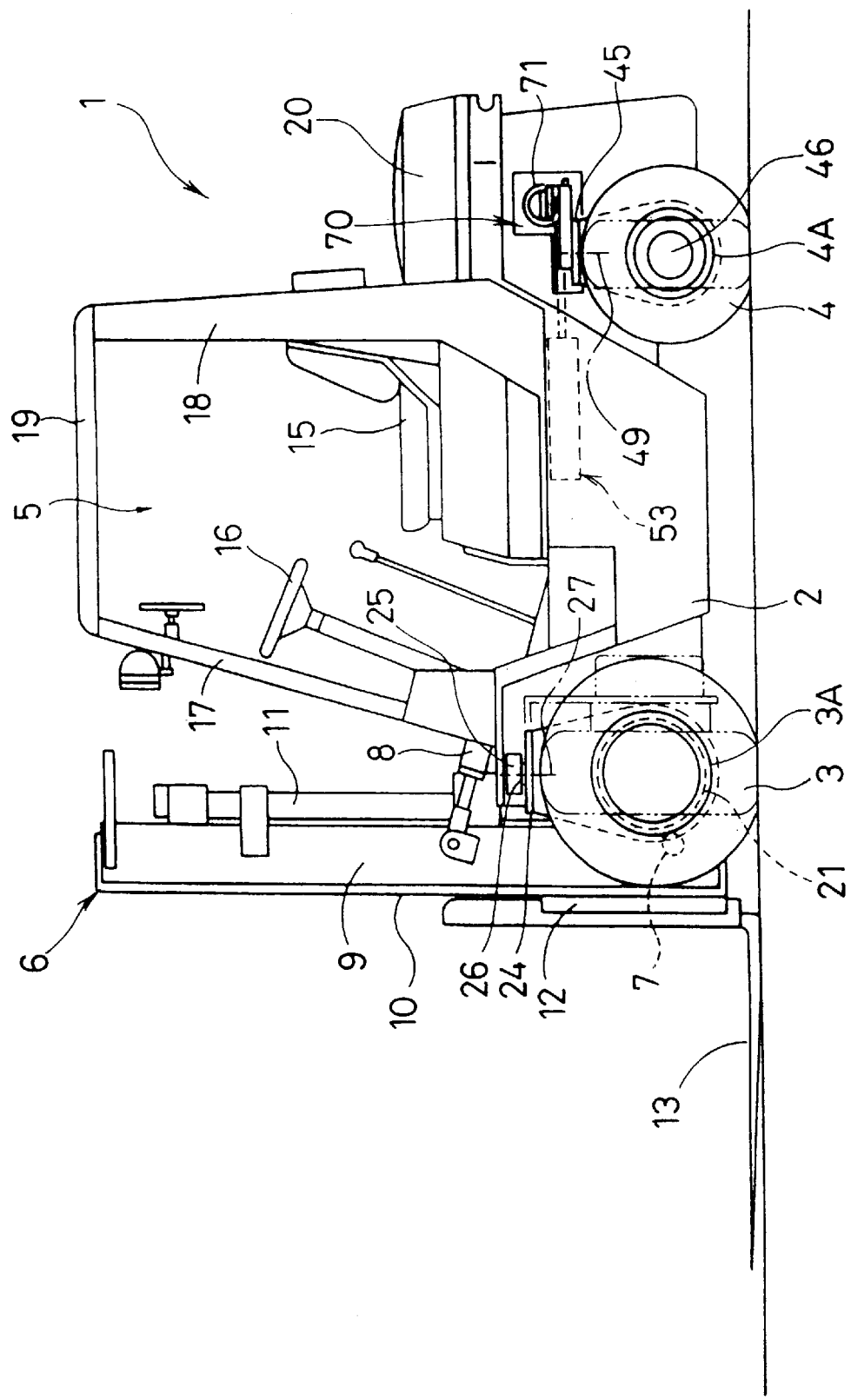
FIG. 12, showing a third embodiment of the invention, is a side view of a forklift having a transverse travel system, during the ordinary travel.
Figure 13:
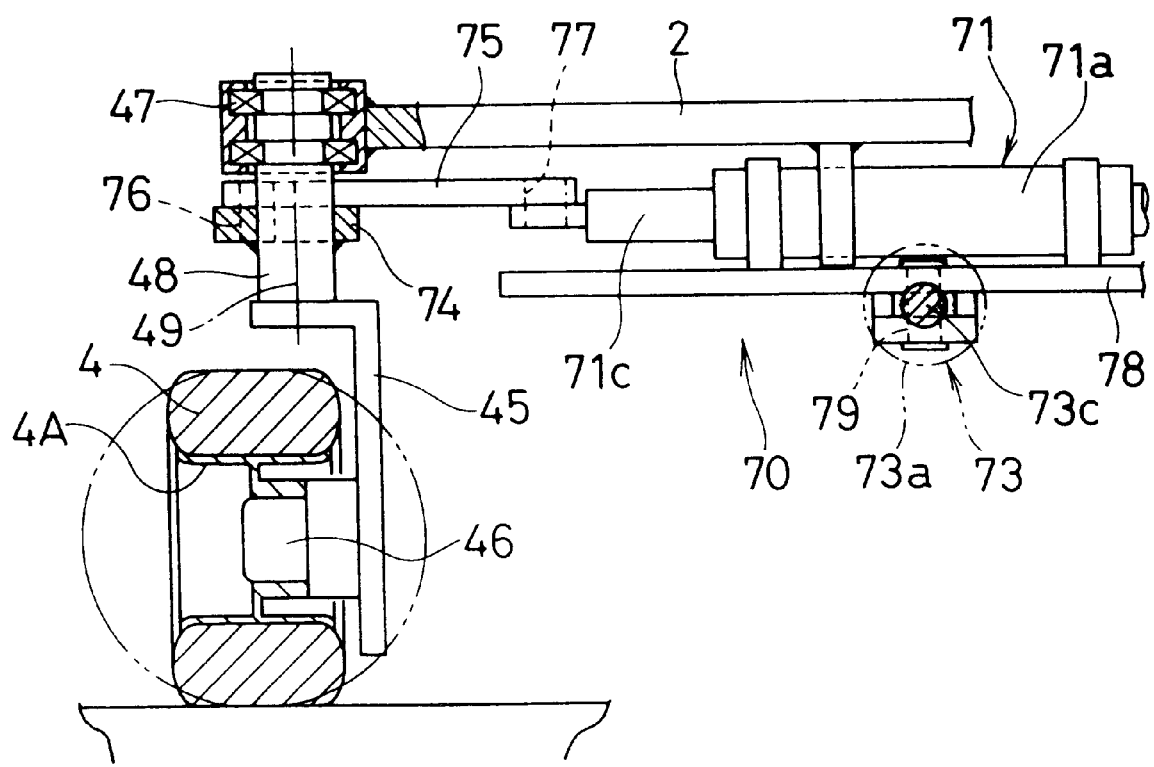
FIG. 13 is a fragmentary front view of the rear wheel portion of said forklift having a transverse travel system.
Figure 14:
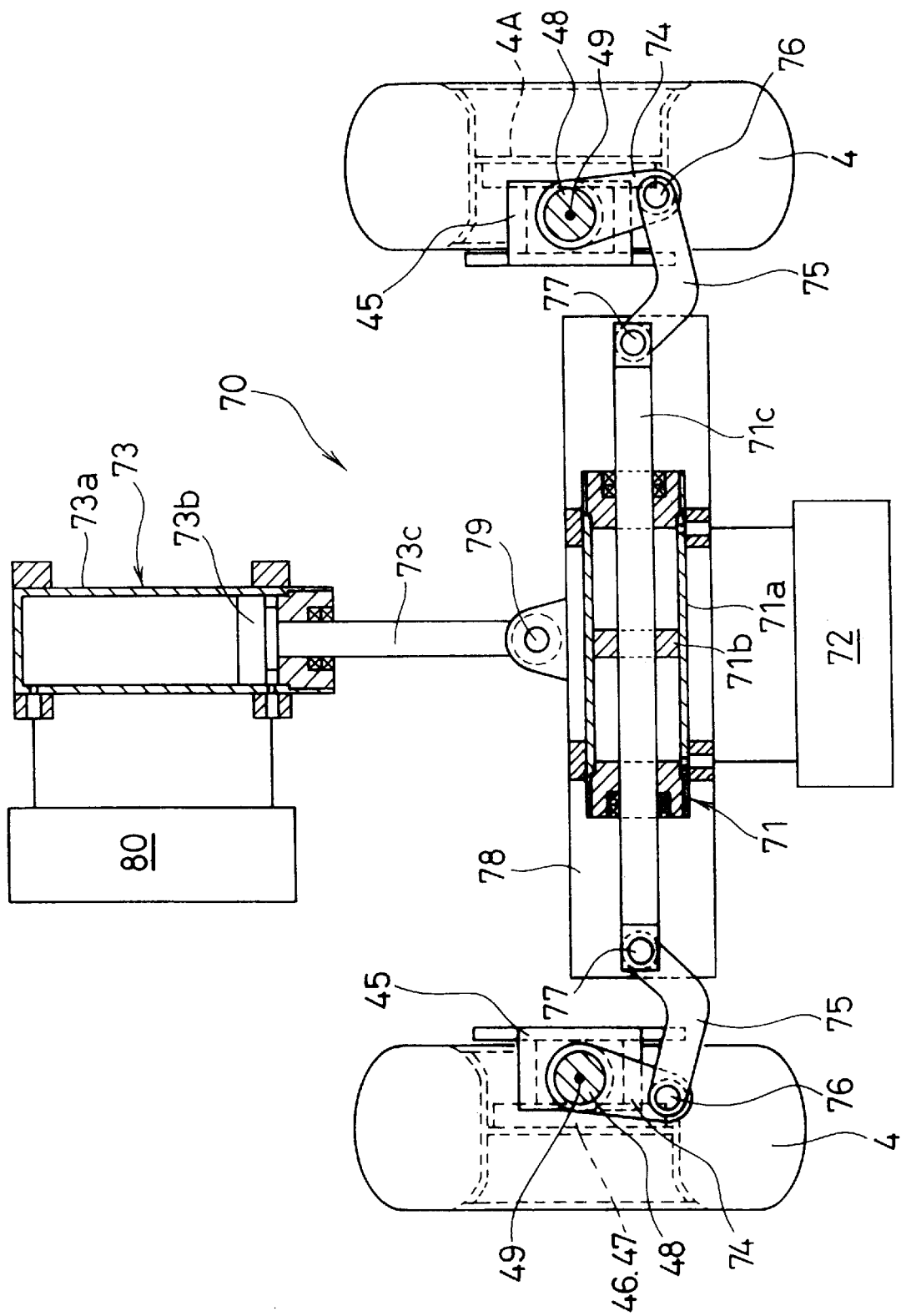
FIG. 14 is a fragmentary plan view of the rear wheel portion of said forklift having a transverse travel system.

In FIGS. 12 through 14, a rear wheel turning means 70 is provided for turning the pair of right and left rear wheels 4 around vertical axes 49. This rear wheel turning means 70 comprises a direction change cylinder 51 adapted to be actuated for movement to the right or left, a rear wheel transverse travel cylinder 53, etc.

That is, the main body 71a, extending from side to side, of the direction change cylinder 71 is fixed on a movable body 78. The movable body 78 is attached to the vehicle body 2 for longitudinal movement through a guide mechanism, such as rails, (not shown), and the piston rod 71c connected to the piston 71b projects widthwise of the vehicle to the opposite sides and is adapted to be actuated for movement to the right or left by the operation of a valve 72. And arm bodies 74 extending from said vertical shafts 48 are relatively turnably connected to the projecting ends of the piston rod 71c through links 75 and vertical connecting pins 76 and 77.

Said rear wheel transverse travel cylinder 73 has a main body 73a extending longitudinally of the vehicle body and attached to the vehicle body 2, and the main body 71a of said direction change cylinder 71 is connected through a connecting pin 79 to the piston rod 73c connected to the piston 73b and projecting rearward (or forward).

Said direction change cylinder 71 is adapted to be actuated for movement to the right or left by an orbit roll (all hydraulic type power steering system) 80 by turning the steering wheel 16. Further, rear wheel transverse travel cylinder 73 is adapted to longitudinally move the direction change cylinder 71 along the longitudinal axis of the vehicle body which is now in the neutral position, to turn the rear wheels 4 for direction change by 90 degrees, and is adapted to assume a predetermined inoperative position during the operation of the direction change cylinder 71.

That is, in the state in which the rear wheel transverse travel cylinder 73 is extended to the limit and the right and left rear wheels 4 are longitudinally directed when the direction change cylinder 71 is in the neutral position, the rear wheel transverse travel cylinder 73 is contracted, whereby the vertical shafts 48 are turned through the links 75 and arm bodies 74, turning the rear wheels 4 for direction change around the vertical axes 49 through the turning members 45, etc., to direct them exactly sideways. In other words, it is arranged that the actuation of the rear wheel transverse travel cylinder 73 turns the right and left rear wheels 4 in mutually opposite directions so that they are directed exactly sideways. Said 71 through 80 constitute by way of example the rear wheel turning means 70 for turning the pair of right and left rear wheels 4 around the vertical axes 49.

The operation of the third embodiment described above will now be described.

The solid lines in FIGS. 12 and 13 and FIG. 14 and (a) of FIG. 16 show linear movement during the ordinary travel. During such travel, direction change can be made in response to the operation of the steering wheel 16.

That is, if the steering wheel 16 is turned counterclockwise, for example, the direction change cylinder 71 can be actuated to move to the left by the orbit roll 80, as shown in (a) of FIG. 15. At this time, the rear wheel transverse travel cylinder 73 is in its inoperative position due to its predetermined extension limit, thus performing the function of a support member. Therefore, the leftward movement of the piston rod 71c is transmitted to the arm bodies 74 through the links 75, thereby turning the turning members 45 around the vertical axes 49 to turn the rear wheels 4 counterclockwise for direction change.

Further, as shown in (b) of FIG. 15, when the direction change cylinder 71 is actuated to move to the leftward limit, the right and left rear wheels 4 can be turned for direction change into an inclined state with their rear ends approaching each other, thereby making it possible to make a pivot turn.

In such switching from longitudinal travel to transverse travel, first the direction change cylinder 71 is put in the neutral (linear movement) position shown in FIG. 14. In this state, a lever type transverse travel mode switch (not shown), for example, is operated to actuate the front wheel turning means 30 and rear wheel turning means 70.

That is, in the front wheel turning means 30, the lever is tilted to actuate the front wheel transverse travel cylinder 31, turning the turning members 24 around the vertical axes 27 through the link 33, etc.; thus, as shown in phantom lines in FIG. 12 and in (b) of FIG. 16, the front wheels 3 are turned for direction change by 90 degrees (directed exactly sideways) with respect to the vehicle body 2.

Further, in the rear wheel turning means 70, the valve 72 is operated to contract the rear wheel transverse travel cylinder 73, moving the direction change cylinder 71 in a forward direction of the vehicle body through the piston rod 73c. Thereupon, the connecting pin 77 together with the direction change cylinder 71 is forwardly moved, and this movement is transmitted to the arm bodies 74 through the links 75, turning the turning members 45 around the vertical axes 49. Thereby, as shown in phantom lines in FIGS. 12 and 13, and in (c) of FIG. 15 and (b) of FIG. 16, the rear wheels 4 are turned for direction change by 90 degrees (directed exactly sideways) with respect to the vehicle body 2. At this time, the direction change cylinder 71 is in the inoperative position at the contraction limit and in the neutral position, thus performing the function of a link. The front wheels 3 and rear wheels 4 change their directions in this manner, whereby the transverse travel mode becomes possible.

Next, a fourth embodiment of the invention will now be described with reference to FIGS. 17 through 21.

A rear wheel turning means 90 is provided for turning the pair of right and left rear wheels 4 around vertical axes 49, said rear wheel turning means 90 having direction change cylinders 91 respectively corresponding to both rear wheels 4, it being arranged that at least one of said direction change cylinders 91 is electrically controlled.

That is, the direction change cylinders 91 each have a main body 91a extending from side to side, the pair of said main bodies linearly extending and being fixed to the vehicle body 2, and the piston rods 91c connected to the pistons 91b project widthwise of the vehicle to the opposite sides. And arm bodies 92 extending from said vertical shafts 48 are relatively turnably connected to the projecting ends of the piston rods 91c through links 93 and vertical connecting pins 94 and 95.

One direction change cylinder 91 is adapted to be actuated to move to the right or left by the operation of an orbit roll (all hydraulic type power steering system) 97 or a semi-integral type power steering system (not shown) controlled by turning the steering wheel 16. The other direction change cylinder 91 is adapted to be actuated to move to the right or left by the operation of an electrically controlled valve 98 to follow said one direction change cylinder.

That is, in the state in which the right and left rear wheels 4 are longitudinally directed with both direction change cylinders 91 in the intermediate actuation position, one of the direction change cylinders 91 is extended according to the turning angle of the steering wheel 16; thus, the vertical shafts 48 are turned through the links 93 and arm bodies 92, and one rear wheel 4 can be turned for direction change around the vertical shaft 49 through the turning member 45, etc., so that it is directed exactly sideways. Further, the valve 98 is operated under electric control to extend the other direction change cylinder 91; thus, the vertical shaft 48 is turned through the link 93 and arm body 92, and the other rear wheel 4 can be turned for direction change around the vertical shaft 49 through the turning member 45, etc., so that it is directed exactly sideways.

In other words, it is arranged that the right and left rear wheels 4 are separately turned for direction change in mutually opposite directions by the actuation of their respective direction change cylinders 91 so that they are directed exactly sideways. Said 91 through 98 constitute by way of example the rear wheel turning means 90 for turning the pair of right and left rear wheels 4 around the vertical axes 49.

The operation of the fourth embodiment described above will now be described.

Figure 17:
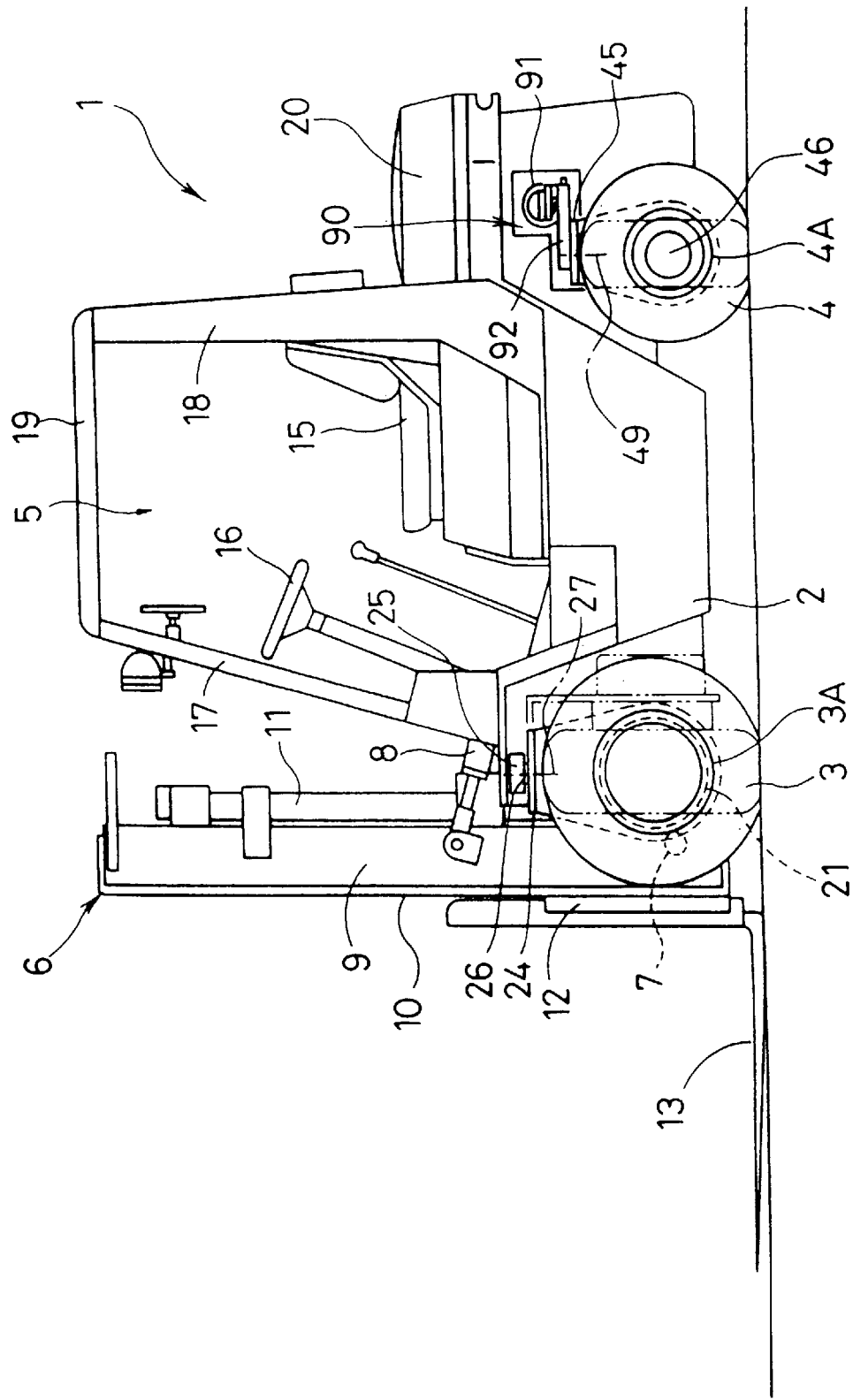
FIG. 17, showing a fourth embodiment of the invention, is a side view of a forklift having a transverse travel system, during the ordinary travel.
Figure 18:
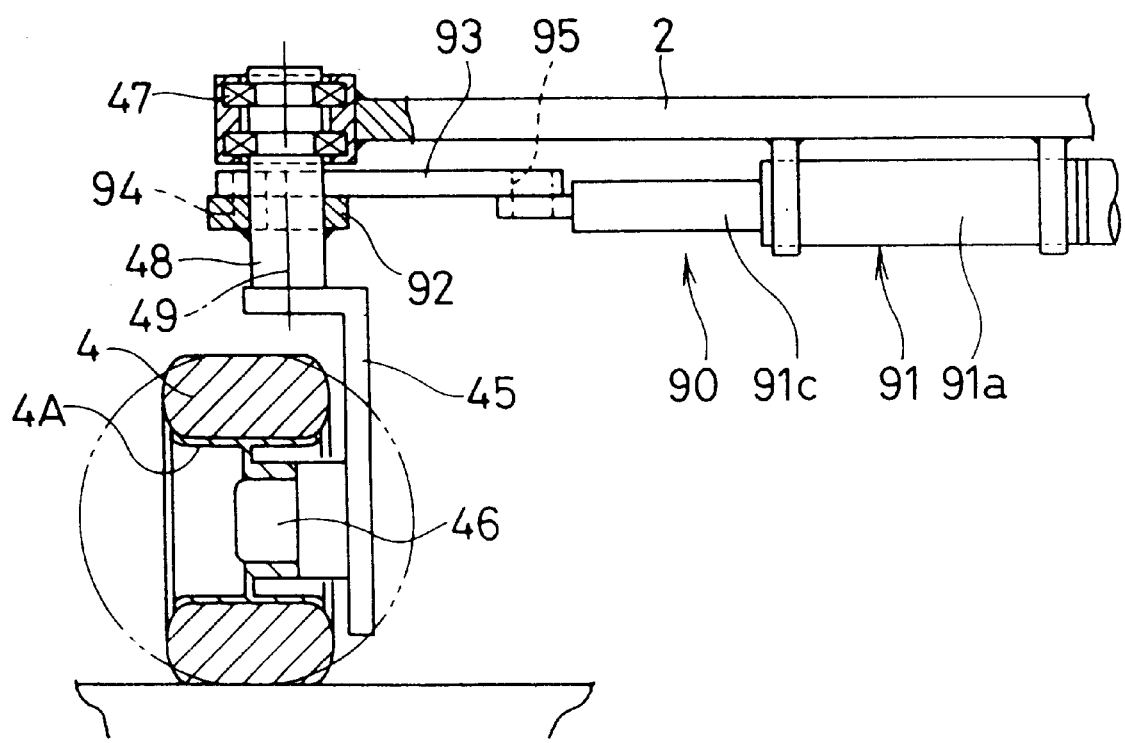
FIG. 18 is a fragmentary front view of the rear wheel portion of said forklift having a transverse travel system.
Figure 19:
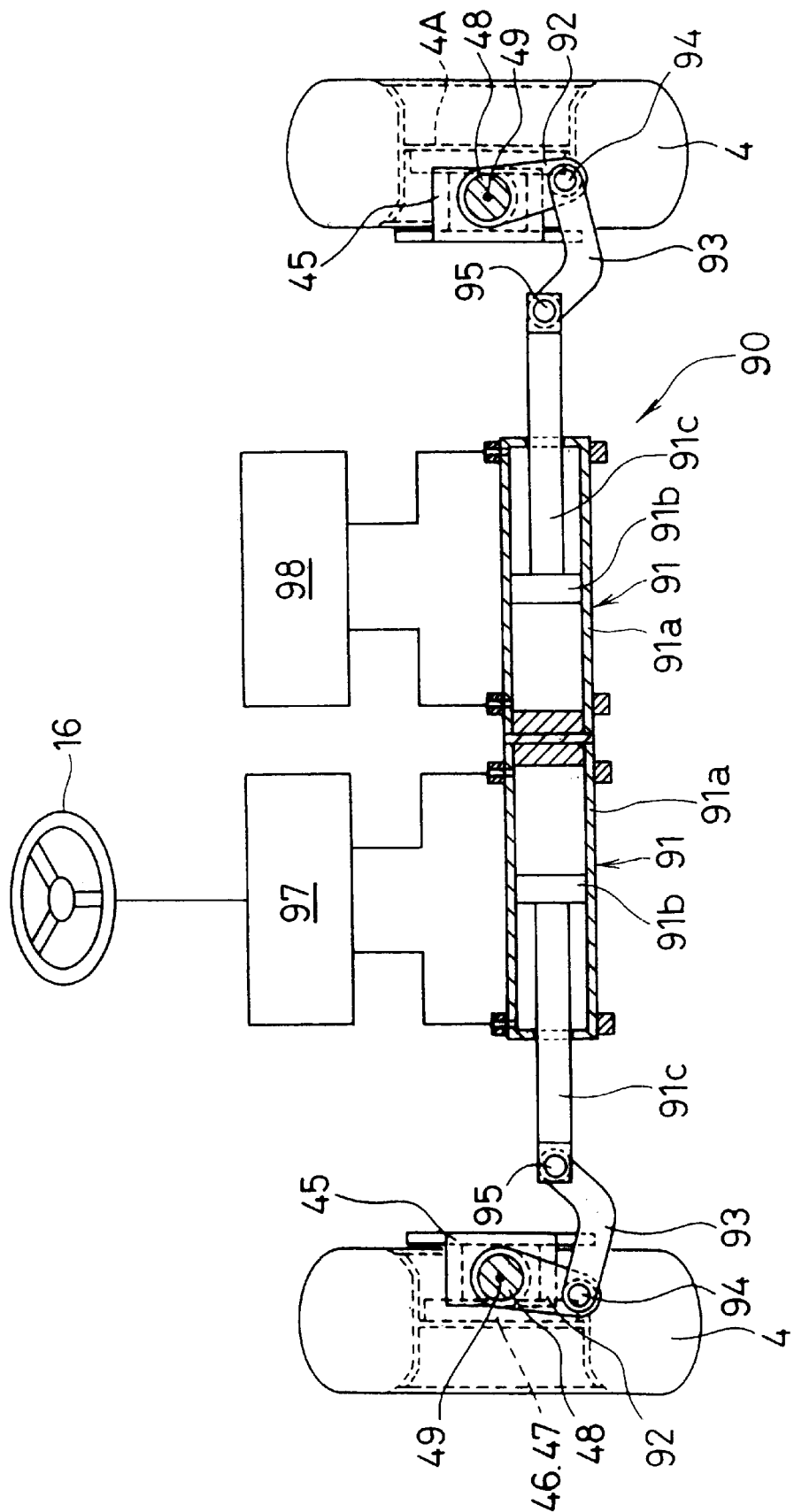
FIG. 19 is a fragmentary plan view of the rear wheel portion of said forklift having a transverse travel system.
Figure 21:
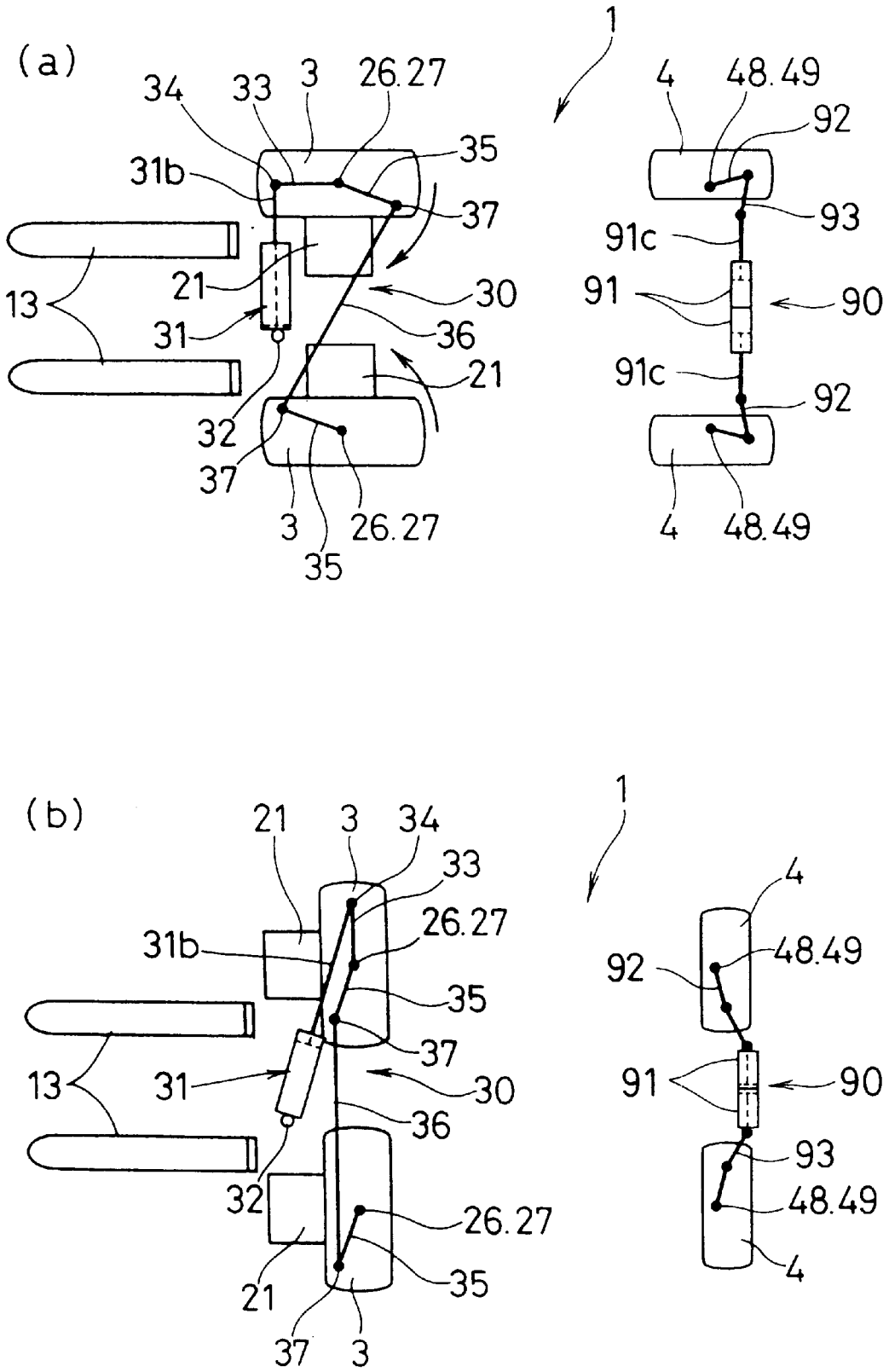
FIG. 21 is a schematic plan view of said forklift having a transverse travel system, the forklift being (a) during the ordinary travel, and (b) during the transverse travel.

Solid lines in FIGS. 17 and 18, FIG. 19 and (a) of FIG. 21 show linear movement during the ordinary travel. At this time, the right and left front wheels 3 and right and left rear wheels 4 are longitudinally directed and on this occasion the pistons 91b of both direction change cylinders 91 in the rear wheel turning means 90 are in the neutral position.

During such travel, the direction can be changed according to the turning angle of the steering wheel 16. That is, if the steering wheel 16 is turned counterclockwise, for example, as shown in (a) of FIG. 20, one direction change cylinder 91 is extended to the midway according to the turning angle of the steering wheel 16 by the orbit roll 97.

At this time, the turning angle of the steering wheel 16 is detected as by a sensor, and valve 98 is electrically controlled on the basis of the detection signal (feedback instruction), whereby the other direction change cylinder 91 is contracted to the midway.

Such extension of one piston rod 91c and contraction of the other piston rod 91c are respectively transmitted to the arm bodies 92 through the links 93; thus both turning members 45 are turned to the midway in the same direction (clockwise) around the vertical axes 49 to turn both rear wheels 4 counterclockwise for direction change by as much angle as required.

Further, as shown in (b) of FIG. 20, when both direction change cylinders 91 are further contracted from the state of FIG. 20(a) to the limit both turning members 45 are turned in the same direction around the vertical axes 49, so that both rear wheels 4 can be turned for direction change into an inclined state with their rear ends approaching each other. In such state, both front wheels 3 are driven for rotation in mutually opposite directions, making it possible to make a pivot turn.

In switching from longitudinal travel to transverse travel, for example, a lever type transverse travel mode switch (not shown) is operated to actuate the front wheel turning means 30 and rear wheel turning means 90.

That is, in the front wheel turning means 30, the tilting of the lever extends the front wheel transverse travel cylinder 31 to turn the turning members 24 around the vertical axes 27 through the link 33, etc., whereby, as shown in phantom lines in FIG. 17 and in (b) of FIG. 21, the front wheels 3 are turned for direction change by 90 degrees (directed exactly sideways) with respect to the vehicle body 2.

Further, in the rear wheel turning means 90, one direction change cylinder 91 is extended almost to the limit according to the turning angle of the steering wheel 16, while the valve 98 is electrically controlled by the transverse travel mode signal to extend the other direction change cylinder 91 almost to the limit. Such extensions of both direction change cylinders 91 almost to their limit respectively turn the vertical shafts 48 through the links 93 and arm bodies 92; thus, as shown in phantom lines in FIGS. 17 and 18 and in (c) of FIG. 20 and (b) of FIG. 21, both rear wheels 4 are turned for direction change around the vertical axes 49 through the turning members 45, etc., for direction change by 90 degrees (directed exactly sideways) with respect to the vehicle body 2.

The fact that the front wheels 3 or rear wheels 4 are thus turned for direction change, or that the front wheels 3 or rear wheels 4 are turned for direction change so as to be directed exactly sideways, is sensed by a sensor to light an indicator lamp, whereby the transverse travel mode becomes possible.

Figure 22:
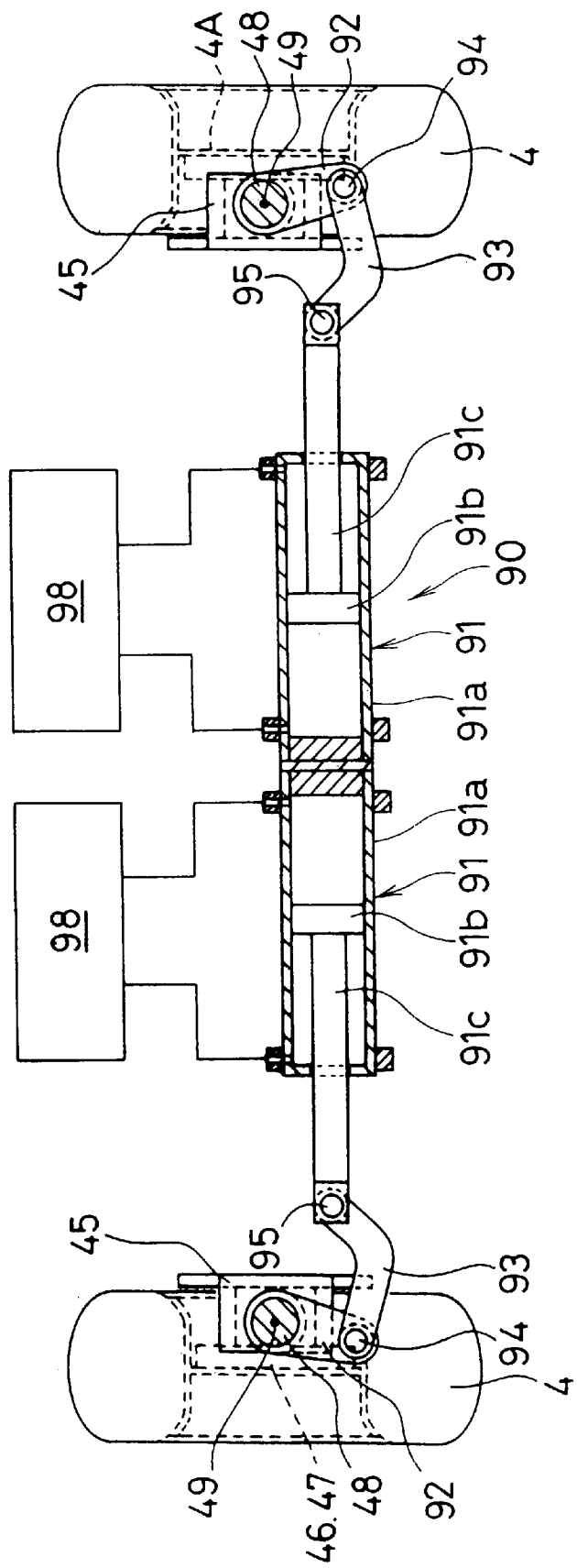
FIG. 22, showing a fifth embodiment of the invention, is a fragmentary plan view of the rear wheel portion of a forklift having a transverse travel system.

A fifth embodiment of the invention will now be described with reference to FIG. 22.

That is, the rear wheel turning means 90 for turning the pair of right and left rear wheels 4 around the vertical axes 49 has direction change cylinders 91 corresponding to both rear wheels 4, it being arranged that both said direction change cylinders 91 are electrically controlled respectively through valves 98.

According to this fifth embodiment, during the ordinary travel, the turning angle of the steering wheel 16 is fed back by the sensor and both valves 98 are correspondingly electrically control, whereby both rear wheels 4 can be turned for direction change in the intended direction by as much angle as required; thus, the forklift 1 can be turned to the right or left. Further, switching from ordinary travel to transverse travel is effected by electrically controlling both valves 98 by the transverse travel mode signal, for example, so as to extend both direction change cylinders 91 almost to the limit; thus, both rear wheels 4 can be turned for direction change by 90 degrees so as to be directed exactly sideways.

Next, a sixth embodiment of the invention will now be described with reference to FIGS. 23 through 27.

A rear wheel turning means 100 is provided for turning the pair of right and left rear wheels 4 around the vertical axes 49, said rear wheel turning means 100 comprising a direction change cylinder 101, a rear wheel transverse travel cylinder 103, etc. That is, the direction change cylinder 101 has its main body 101a disposed widthwise of the vehicle, and a piston rod 101c connected to its piston 101b projects to the opposite sides widthwise of the vehicle. And the projecting ends of the piston rod 101c are fixed to the vehicle body 2 through the holding frames 102; thus, it is arranged that the main body 101a is movable widthwise of the vehicle.

Rear wheel transverse travel cylinders 103 form a pair, disposed right and left, with their respective main bodies 103a integrated with (connected to) the main body 101a of said direction change cylinder 101 through connecting members 104. On this occasion, the piston rods 103c connected to the pistons 103b of these rear wheel transverse travel cylinders 103 respectively project outside widthwise of the vehicle. And the arm bodies 105 extending from said vertical shafts 48 are relatively turnably connected to the projecting ends of the piston rods 103c through the links 106 and the vertical connecting pins 107 and 108.

According to said rear wheel turning means 100, the actuation of the direction change cylinder 101 is effected in that the main body 101a is moved widthwise of the vehicle with respect to the fixed piston rod 101c. And the main bodies 103a of the rear wheel transverse travel cylinders 103 are moved widthwise of the vehicle integrally with the main body 101a of the direction change cylinder 101. On this occasion, a guide body 109 extending through the connecting members 104 is installed between the holding frames 102; thus, guide of movement and prevention of rotation of the main bodies 101a and 103a are effected by the guide body 109.

It is arranged that in that the steering wheel 16 is turned, the actuation of said direction change cylinder 101 is effected by an orbit roll (all hydraulic type power steering system) 110. Further, the rear wheel transverse travel cylinders 103, which form a pair, disposed right and left, are adapted to allow the rear wheels 4 to be separately turned by actuating the control valve 111 when the direction change cylinder 101 is in the neutral position, and are adapted to assume a predetermined inoperable position during the actuation of the direction change cylinder 101.

Therefore, by turning the vertical shafts 48 through the links 106 and arm bodies 105 by the actuation of the rear wheel transverse travel cylinders 103, it is possible to turn the rear wheels 4 for direction change around the vertical axes 49 through the turning members 45, etc., so that they are directed exactly sideways. That is, it is arranged that the actuation of the rear wheel transverse travel cylinders 103 turns the right and left rear wheels 4 for direction change so that they face in the same direction, directed exactly sideways. Said 101 through 111 constitute by way of example the rear wheel turning means 100 for turning the pair of right and left rear wheels 4 around the vertical axes 49.

The operation of the sixth embodiment described above will now be described.

Figure 23:
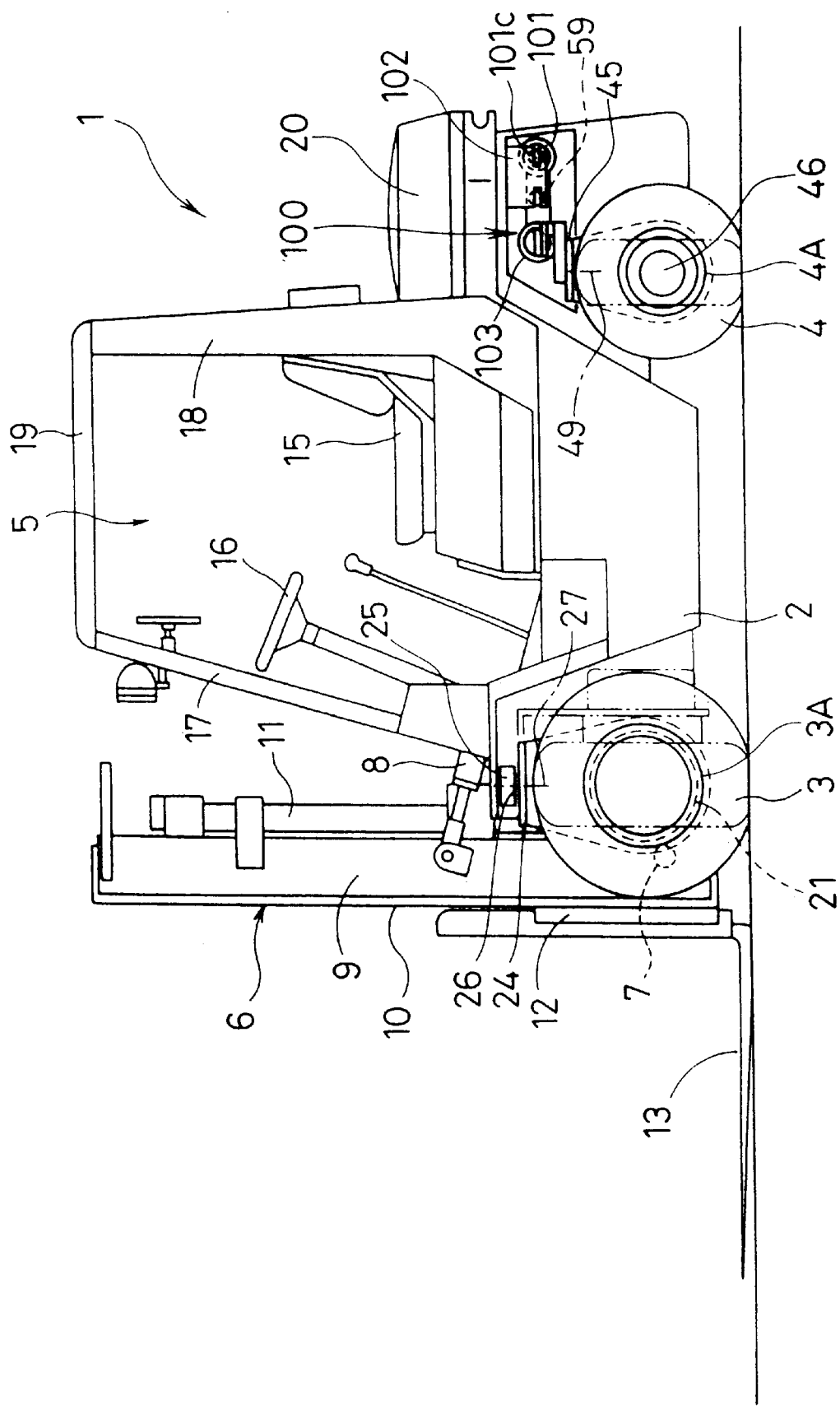
FIG. 23, showing a sixth embodiment of the invention, is a plan view of a forklift having a transverse travel system, during the ordinary travel.
Figure 24:
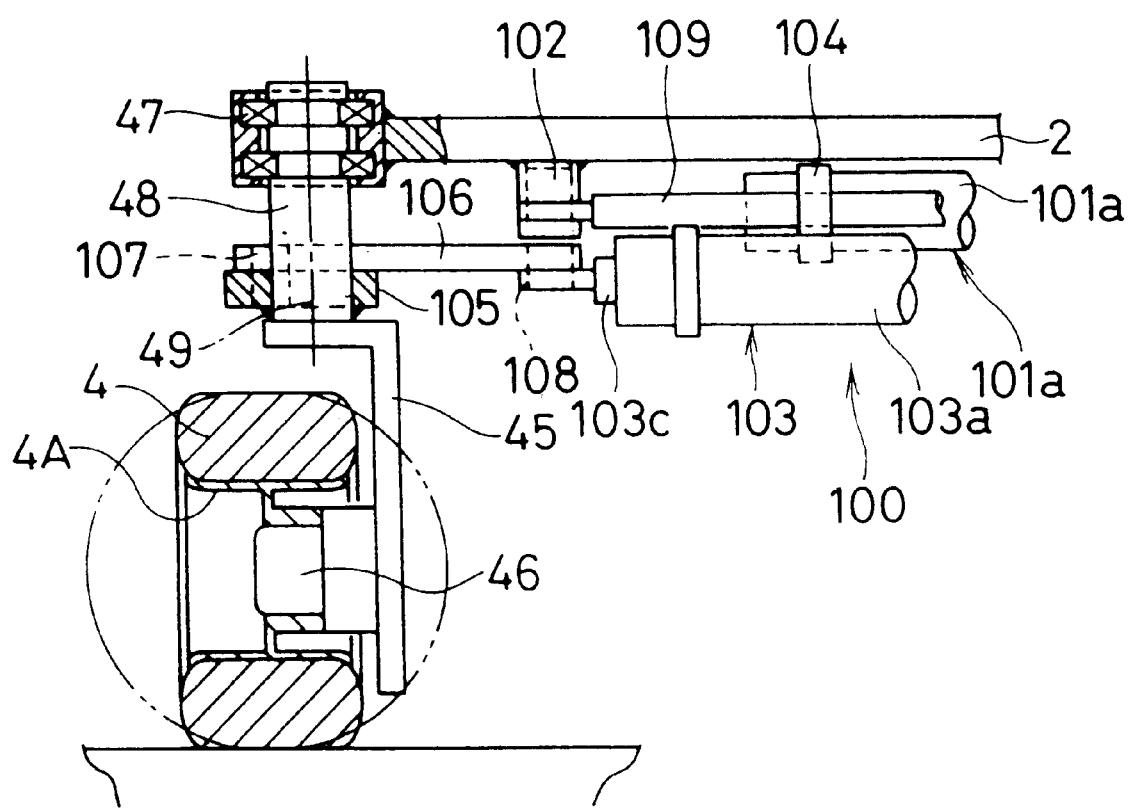
FIG. 24 is a fragmentary front view of the rear wheel portion of said forklift having a transverse travel system.
Figure 25:
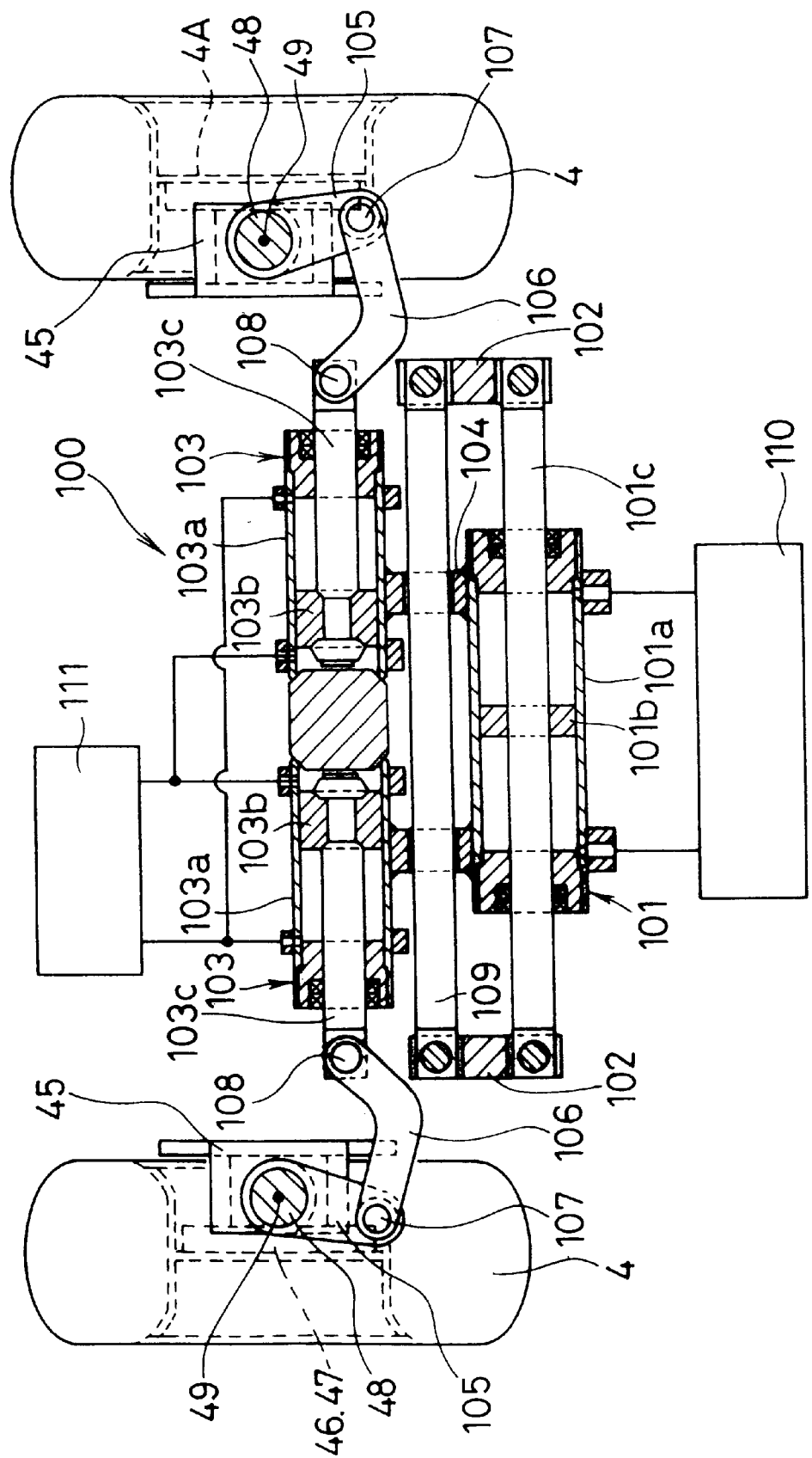
FIG. 25 is a fragmentary plan view of the rear wheel portion of said forklift having a transverse travel system.

The solid lines in FIGS. 23 and 24, FIG. 25 and (a) of FIG. 26 show linear movement during the ordinary travel. During such travel, the direction is changed according to the operation of the steering wheel 16.

That is, turning the steering wheel 16 counterclockwise, for example, causes the orbit roll 110 to move the main body 101a of the direction change cylinder 101 to the left, as shown in (a) of FIG. 27, integrally moving the main bodies 103a of both rear wheel transverse travel cylinders 103 to the left through the connecting members 104. At this time, both rear wheel transverse travel cylinders 103 are in the inoperative position at the predetermined contraction limit, thus performing the function of a link.

Therefore, the leftward movement of both rear wheel transverse travel cylinders 103 is transmitted to the arm bodies 105 through the links 106, thus turning the turning members 45 around the vertical axes 49 to turn the rear wheels 4 to the left for direction change. In addition, during the ordinary turning in response to the operation of the steering wheel 16, one rear wheel transverse travel cylinder 103 is under tension; therefore, in order to prevent leakage, a check valve is placed in the circuit or pressure is periodically applied to the rear wheel transverse travel cylinders 103.

Further, as shown in (b) of FIG. 27, when the main body 101a of the direction change cylinder 101 is actuated to move to the leftward limit, the right and left rear wheels 4 can be turned for direction change into an inclined state with their rear ends approaching each other, thus making it possible to make a pivot turn. In addition, in the same manner as described above it is possible, for example, to make a right turn by turning the steering wheel 16 clockwise.

In switching from such ordinary travel to transverse travel, first the direction change cylinder 101 is put in the neutral (linear movement) position shown in FIG. 25. In this state, for example, a lever type transverse travel mode switch (not shown) is operated to actuate the front wheel turning means 30 and the rear wheel turning means 100.

Figure 3:
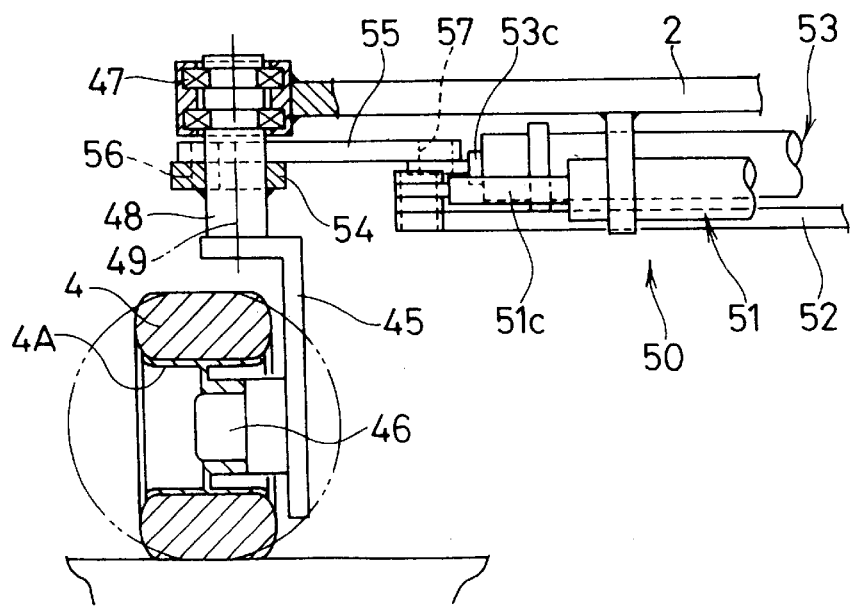
FIG. 3 is a fragmentary front view of part of the rear wheel portion of the forklift having a transverse travel system.

That is, in the front wheel turning means 30, tilting the lever actuates the front wheel transverse travel cylinder 31, turning the turning members 24 around the vertical axes 27 through the link 33, etc.; thus, as shown in (b) of FIG. 1 and in phantom lines in FIGS. 2 and 3, the front wheels 3 are turned for direction change by 90 degrees (directed exactly sideways) with respect to the vehicle body 2.

Further, in the rear wheel turning means 100, both rear wheel transverse travel cylinders 103 are extended by the control valve 111, and the projecting movement of the piston rods 103c is transmitted to the arm bodies 105 through the links 106, thereby turning the turning members 45 around the vertical axes 49; thus, as shown in phantom lines in FIGS. 23 and 24 and in (b) of FIG. 26 and (c) of FIG. 27, the rear wheels 4 are turned for direction change by 90 degrees (directed exactly sideways) with respect to the vehicle body 2.

The fact that the front wheels 3 or rear wheels 4 are thus turned for direction change, or that the front wheels 3 or rear wheels 4 are thus turned for direction change so as to be directed exactly sideways, is sensed by a sensor to light an indicator lamp, whereby the transverse travel mode becomes possible.

In each embodiment described above, a 2-pump 2-motor type hydraulic driving system is used as a driving system for the forklift 1; however, 1-pump 2-motor type hydraulic driving system may be employed.

In the embodiments described above, the invention has been employed in an ordinary forklift 1; however, it may also be employed, for example, in a side forklift adapted to freely travel for carrying heavy loads or a side forklift adapted to travel in a given automatic transfer line or the like in that a pickup coil installed on the vehicle body catches electromagnetic wave in an induction line on the floor.

What is claimed is:

1. A forklift having a transverse travel system with a vehicle body provided with a pair of right and left front wheels and a pair of right and left rear wheels, characterized in that said front and rear wheels are respectively adapted to be turnable for direction change by 90 degrees, said pair of right and left front wheels are respectively operatively connected to drive shafts of travel driving devices, said travel driving devices being adapted to be turnable around vertical axes with respect to the vehicle body and being provided with front wheel turning means, while said pair of right and left rear wheels are adapted to be turnable around vertical axes with respect to the vehicle body and are provided with rear wheel turning means, said rear wheel turning means having a direction change cylinder and a pair of right and left rear wheel transverse travel cylinders, said direction change cylinder having a main body attached to the vehicle body and a piston rod projecting widthwise of the vehicle body to the opposite sides to each other, between projecting opposite ends of said piston rod being attached about a holding frame, said rear wheel transverse travel cylinders having main bodies as linearly positioned one unit attached to the holding frame and disposed in parallel with the main body of the direction change cylinder, piston rods respectively projecting outward widthwise of the vehicle body, projecting outward ends of the piston rods being relatively, turnably connected to turning members mounted with rear wheels, said rear wheel transverse travel cylinders being adapted to separately turn the rear wheels when the direction change cylinder is in the neutral position and also adapted to assume a predetermined inoperative position during the actuation of the direction change cylinder.

2. A forklift having a transverse travel system with a vehicle body provided with a pair of right and left front wheels and a pair of right and left rear wheels, characterized in that said front and rear wheels are respectively adapted to be turnable for direction change by 90 degrees, said pair of right and left front wheels are respectively operatively connected to drive shafts of travel driving devices, said travel driving devices being adapted to be turnable around vertical axes with respect to the vehicle body and being provided with front wheel turning means, while said pair of right and left rear wheels are adapted to be turnable around vertical axes with respect to the vehicle body and are provided with rear wheel turning means, said rear wheel turning means having a direction change cylinder and a pair of right and left rear wheel transverse travel cylinders, said direction change cylinder having a main body attached to the vehicle body and a piston rod projecting widthwise of the vehicle body to the opposite sides to each other, between projecting opposite ends of said piston rod being installed parallely about a holding frame, said rear wheel transverse travel cylinders having main bodies attached to the holding frame and piston rods respectively projecting outward widthwise of the vehicle body, said rear wheel transverse travel cylinders adapted to separately turn the rear wheels when the direction change cylinder is in the neutral position and also adapted to assume a predetermined inoperative position during the actuation of the direction change cylinder, said front wheel turning means having a front wheel transverse travel cylinder, said front wheel transverse travel cylinder and said rear wheel transverse travel cylinders being connected in parallel hydraulic circuit to a common transverse travel control valve between the front wheel transverse travel cylinder and the transverse travel control valve being disposed an front wheel open/close valve, between the rear wheel transverse travel cylinder and the transverse travel control valve being disposed an rear wheel open/close valve, wherein said rear wheel open/close valve is opened in response to a transverse travel operation by an operator, the rear wheel transverse travel cylinder is actuated to move to a transverse travel side in response to the operation of the transverse travel control valve, and the completion of the transverse orientation of the rear wheels is detected, whereby the rear wheel open/close valve is closed and the front wheel open/close valve is opened wherein said front wheel open/close valve is kept open to operate the transverse control valve during transverse travel, whereby the front transverse travel cylinder is moved in a range of about ±5° in terms of the angle of the front wheels, so that each front wheel is turned opposite direction to each other.

3. A forklift having a transverse travel system with the vehicle body provided with a pair of right and left front wheels and a pair of right and left rear wheels, characterized in that said front and rear wheels are respectively adapted to be turnable for direction change by 90 degrees, said pair of right and left front wheels are respectively operatively connected to drive shafts of travel driving devices, said travel driving devices being adapted to be turnable around vertical axes with respect to the vehicle body and being provided with front wheel turning means, while said pair of right and left rear wheels are adapted to be turnable around vertical axes with respect to the vehicle body and are provided with rear wheel turning means, said rear wheel turning means having a direction change cylinder and a rear wheel transverse travel cylinder, said direction change cylinder having a main body extending widthwise of the vehicle body and fixed on a movable body moving in longitudinal direction of the vehicle body, a piston rod projecting widthwise of the vehicle to the opposite sides, projecting opposite ends of the piston rod being connected to a pair of rear wheels through a link, said rear wheel transverse travel cylinder having a main body extending longitudinally of the vehicle body and attached to the vehicle body, its piston rod being connected to said direction change cylinder, said rear wheel transverse travel cylinder being adapted to move the direction change cylinder, which is now in the neutral position, back and forth along a longitudinal axis of the vehicle body so as to turn the rear wheels for direction change by 90 degrees, and also adapted to assume a predetermined inoperative position during the actuation of the direction change cylinder.

4. A forklift having a transverse travel system with the vehicle body provided with a pair of right and left front wheels and a pair of right and left rear wheels, characterized in that said front and rear wheels are respectively adapted to be turnable for direction change by 90 degrees, said pair of right and left front wheels are respectively operatively connected to drive shafts of travel driving devices, said travel driving devices being adapted to be turnable around vertical axes with respect to the vehicle body and being provided with front wheel turning means, while said pair of right and left rear wheels are adapted to be turnable around vertical axes with respect to the vehicle body and are provided with rear wheel turning means, said rear wheel turning means having a direction change cylinder and a pair of right and left rear wheel transverse travel cylinders, said direction change cylinder having a main body extending widthwise of the vehicle body and a piston rod projecting widthwise of the vehicle body to the opposite sides, projecting opposite ends of said piston rod being fixed to the vehicle body through holding frames, a guide being installed between the holding frames to allow only the main body to move widthwise of the vehicle body, said rear wheel transverse travel cylinders having main bodies as linearly positioned one unit disposed in parallel with the direction change cylinder and connected to the direction change cylinder through connecting members moving by a guide of the guide body, piston rods projecting outward widthwise of the vehicle body, projecting outward ends of the piston rods being relatively turnably connected to turning members mounted with rear wheels, said rear wheel transverse travel cylinders being adapted to separately turn the rear wheels when the direction change cylinder is in the neutral position and also adapted to assume a predetermined inoperative position during the actuation of the direction change cylinder.

* * * * *